(12) United States Patent
Shi et al.

(10) Patent No.: US 12,610,340 B2
(45) Date of Patent: Apr. 21, 2026

(54) METHOD FOR REPORTING POSITIONING CAPABILITY, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Jiejiao Tian, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 325 days.

(21) Appl. No.: 18/340,100

(22) Filed: Jun. 23, 2023

(65) Prior Publication Data

US 2023/0337175 A1      Oct. 19, 2023

Related U.S. Application Data

(63) Continuation of application No. PCT/CN2020/142234, filed on Dec. 31, 2020.

(51) Int. Cl.
| | |
|---|---|
| *H04W 64/00* | (2009.01) |
| *H04W 8/24* | (2009.01) |
| *H04W 72/23* | (2023.01) |

(52) U.S. Cl.
CPC ............. *H04W 64/00* (2013.01); *H04W 8/24* (2013.01); *H04W 72/23* (2023.01)

(58) Field of Classification Search
CPC ....... H04W 64/00; H04W 72/23; H04W 8/24; G01S 5/0009; G01S 5/0236
See application file for complete search history.

(56) References Cited

U.S. PATENT DOCUMENTS

| | | | |
|---|---|---|---|
| 12,323,941 B2* | 6/2025 | Qi ...................... | G01S 5/02585 |
| 2020/0145955 A1 | 5/2020 | Opshaug et al. | |
| 2021/0360371 A1* | 11/2021 | Qiao ..................... | H04W 4/029 |
| 2022/0330198 A1* | 10/2022 | Ren ....................... | H04W 64/00 |
| 2023/0031427 A1* | 2/2023 | Manolakos ........... | G01S 5/0018 |
| 2023/0156655 A1* | 5/2023 | Manolakos ........... | H04W 64/00 |
| | | | 455/456.2 |
| 2024/0019521 A1* | 1/2024 | Fakoorian ............. | G01S 5/0009 |

FOREIGN PATENT DOCUMENTS

| | | |
|---|---|---|
| CN | 109600814 | 4/2019 |
| CN | 111586832 | 8/2020 |
| WO | 2020022835 | 1/2020 |
| WO | 2020206021 | 10/2020 |

OTHER PUBLICATIONS

"3rd Generation Partnership Project; Technical Specification Group Radio Access Network; LTE Positioning Protocol (LPP) (Release 16)," 3GPP TS 37.355, Sep. 2020, v16.2.0.

(Continued)

*Primary Examiner* — Congvan Tran
(74) *Attorney, Agent, or Firm* — Hodgson Russ LLP

(57) ABSTRACT
Provided are a method for reporting positioning capability, a terminal device, and a network device. In the method, a terminal device reports through a first signaling to a network device a first user equipment (UE) capability supported by the terminal device, and the first UE capability is a positioning function based on joint use of multiple downlink (DL) positioning signals.

19 Claims, 5 Drawing Sheets

(56) References Cited

OTHER PUBLICATIONS

"3rd Generation Partnership Project; Technical Specification Group Radio Access Network; Study on NR Positioning Enhancements; (Release 17)," 3GPP TR 38.857, Nov. 2020, v0.4.0.

Huawei et al., "Positioning enhancement in Rel-17," 3GPP TSG RAN WG1 Meeting #103-e, R1-2007577, Oct. 2020.

Oppo, "Discussions on NR Positioning Enhancements," 3GPP TSG RAN WG1 #103-e, R1-2008226, Oct. 2020.

Qualcomm Incorporated, "Potential Positioning Enhancements for NR Rel-17 Positioning," 3GPP TSG RAN WG1 #103-e, R1-2008619, Oct. 2020.

Oppo, "Discussion on WI Scope of NR Positioning Enhancements," 3GPP TSG RAN Meeting #90-e, RP-202305, Dec. 2020.

Qualcomm Incorporated, "Discussion on NR Positioning capabilities," 3GPP TSG RAN WG1 Meeting #100b-e, R1-2002569, Apr. 2020.

WIPO, International Search Report and Written Opinion for International Application No. PCT/CN2020/142234, Sep. 28, 2021.

CATT, "FL Summary #5 for Potential Positioning Enhancements," f3GPP TSG RAN WG1 Meeting #102-e, R1-2007343, May 2020.

Qualcomm Incorporated, "LPP miscellaneous corrections," 3GPP TSG-RAN WG2 Meeting #111-e, R2-2008260, Aug. 2020.

CATT, "FL Summary #4 for Potential Positioning Enhancements," 3GPP TSG RAN WG1 Meeting #103-e, R1-2009396, Oct. 2020.

EPO, Extended European Search Report for EP Application No. 20967770.7, Jan. 16, 2024.

* cited by examiner

NETWORK DEVICE

TRANSCEIVER
MODULE 601

METHOD FOR REPORTING POSITIONING CAPABILITY, TERMINAL DEVICE, AND NETWORK DEVICE

CROSS-REFERENCE TO RELATED APPLICATION(S)

This application is a continuation of International Application No. PCT/CN2020/142234, filed Dec. 31, 2020, the entire disclosure of which is incorporated herein by reference.

TECHNICAL FIELD

This disclosure relates to the field of communication, and particularly relates to methods for reporting positioning capability, terminal devices, network devices, and a computer readable storage medium.

BACKGROUND

In a new radio (NR) system, it can be seen according to a basic principle of positioning that if a bandwidth of a signal used for positioning increases, theoretically, positioning accuracy can be improved. In one aspect, a maximum bandwidth of one NR carrier is limited, for example, in frequency range 1, a maximum bandwidth of one NR carrier is 100 MHz. On the other hand, the spectrum of the operator is limited, and the spectrum of a single carrier may not reach the maximum bandwidth supported by the protocol. For positioning signals in different carriers, they can be measured independently. In order to further improve the positioning accuracy, a plurality of (two or more) positioning signals can be used jointly to support the positioning function. At present, there is no related UE capability reporting mechanism for a solution where multiple positioning signals are jointly used to support a positioning function.

SUMMARY

In a first aspect of implementations of the disclosure, disclosed is a method for reporting positioning capability, includes: a terminal device reports, through a first signaling, to a network device a first UE capability supported by the terminal device, where the first user equipment (UE) capability is a positioning function based on joint use of multiple downlink (DL) positioning signals.

In a second aspect of implementations of the disclosure, disclosed is a terminal device. The terminal device includes: a memory storing executable computer codes; a transceiver and a processor coupled with the memory; the processor and the transceiver are configured to perform the method in the first aspect of implementations of the disclosure.

In a third aspect of implementations of the disclosure, disclosed is a network, device. The network device includes: a memory storing executable computer codes; a transceiver and a processor coupled with the memory; the processor and the transceiver are configured to perform the method in the second aspect of implementations of the disclosure.

DETAILED DESCRIPTION

The following describes the technical solutions in implementations of the disclosure with reference to the accompanying drawings in the implementations of the disclosure. Apparently, the described implementations are merely a part rather than all of the implementations of the disclosure. All other implementations obtained by persons skilled in the art based on the implementations of the disclosure without creative efforts shall belong to the scope of protection of the disclosure.

A brief description of relevant background involved in the disclosure will be given first, as given below.

A positioning technology is one of core technologies of a modem communication system and a navigation system, for example, a satellite navigation system, Bluetooth, and wireless fidelity (WiFi) all provide a positioning function. Likewise, a modern cellular communication system also supports a positioning function. Starting from a 3G and 4G long term evolution (LTE) communication system, various advanced positioning technologies are gradually added to the cellular communication system. In a 5G new radio (NR) communication system, a positioning technology is also supported, and a specific standard is introduced in Release 16. In a new radio (NR) of 3GPP Release 16 (R16), the following positioning technologies are introduced:

1) a positioning method of downlink-time difference of arrival (DL-TDOA);
2) a positioning method of uplink-time difference of arrival (UL-TDOA);
3) a positioning method of multiple round trip time (DL-TDOA);
4) a positioning method of downlink-angle of departure (DL-AoD);
5) a positioning method of uplink-angle of departure (UL-AoD);
6) a positioning method of enhanced Cell ID.

In order to support various positioning methods, R16 NR introduces a positioning reference signal (PRS) in DL, and introduce a sounding reference signal for positioning (SRS for positioning) in UL.

The NR-based positioning function mainly relates to three parts.

1) User equipment (UE).

2) Multiple transmission/reception points (TRPs).

Multiple TRPs around a UE participate in cellular positioning; one base station may be one TRP; and one base station may have multiple TRPs.

3) Location server.

Operations of the location server includes a positing procedure and the like. For example, the location server may include a location management function (LMF).

1. A DL-based positioning method can be further divided into two major categories.

1) UE-assisted positioning method i. The UE is responsible for positioning related measurement.

ii. The network calculates location information according to the measurement result reported by the UE.

2) UE-based positioning method i. The UE performs positioning related measurement, and calculates the location information according to the measurement result.

Figures 1A, 1B:
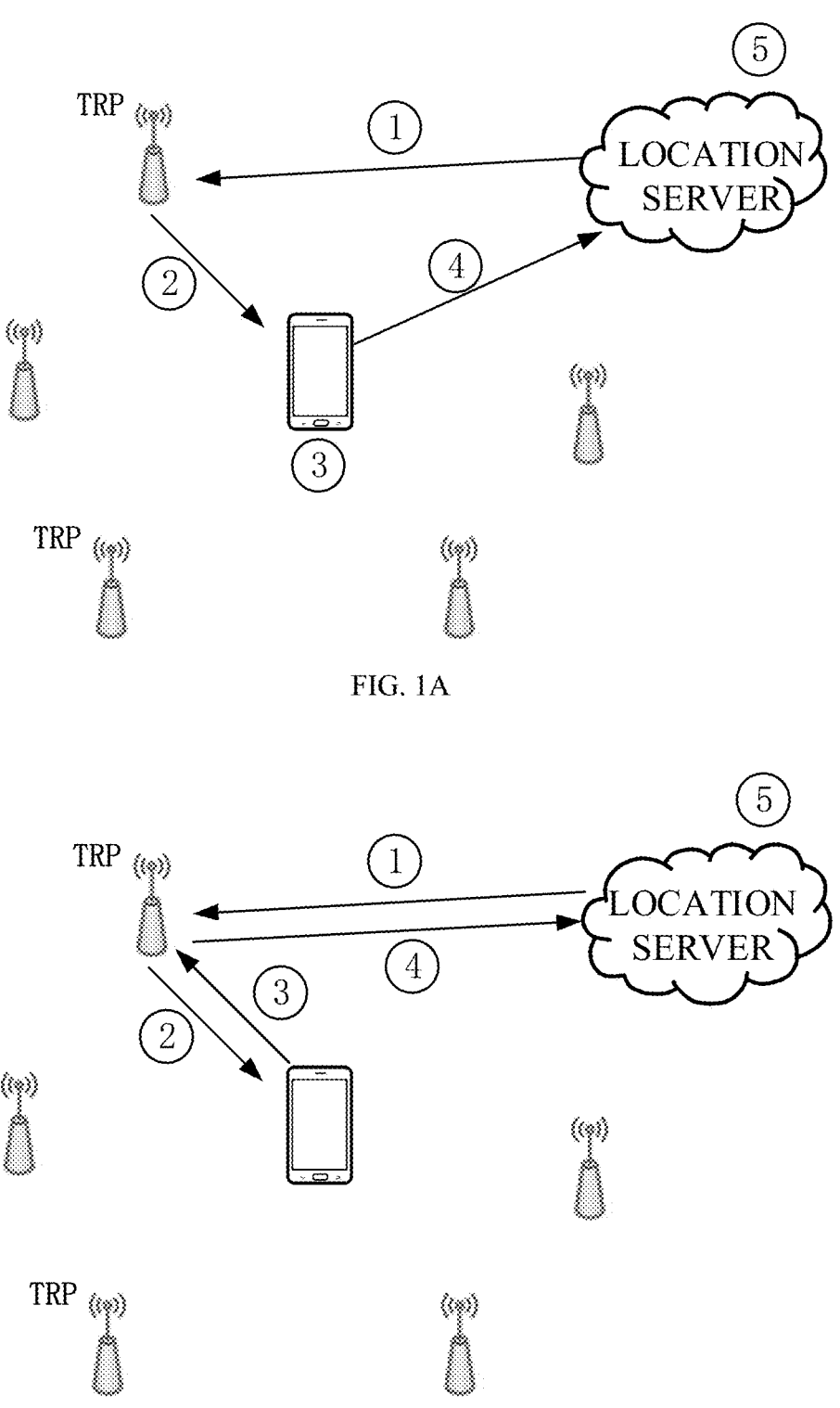
FIG. 1A is a schematic diagram of a downlink (DL)-based positioning method according to an implementation of the disclosure.
FIG. 1B is a schematic diagram of an uplink (UL)-based positioning method according to an implementation of the disclosure.

2. Next, a basic procedure (FIG. 1A) will be described for a DL-based positioning method (UE-assisted positioning method).

1) The location server notifies TRP related configuration, which may include configuration information for PRS, and/or may include type of a measurement result needs to be reported by the UE.

2) The TRP transmits a positioning signal PRS.

3) The UE receives the positioning signal PRS and performs measurements. With regard to different positioning methods, the measurement results required by the UE is different.

4) The UE feeds back the measurement result to the location server. The UE feeds back the measurement result to the location server via a base station.

5) The location server calculates location related information.

The above is a schematic procedure of a UE-assisted positioning method. For a UE-based positioning method, in the above step 4), the UE calculates the location related information directly according to the measurement result, and does not have to report the measurement result to the location server for the location server to calculate. In the UE-based positioning method, the UE has to know location information corresponding to the TRP and therefore, the network needs to notify the UE of the location information corresponding to the TRP in advance.

3. Next, a basis procedure (FIG. 1B) is described for a UL-based positioning method.

1) A location server notifies TRP related configuration.

2) The base station transmits a relevant signaling to the UE.

3) The UE transmits a UL signal (SRS for positioning).

4) The TRP measures the "SRS for positioning" and sends the measurement result to the location server.

5) The location server calculates location related information.

According to a basic principle of positioning, if a bandwidth of a signal used for positioning increases, theoretically, positioning accuracy can be improved. In one aspect, a maximum bandwidth of one NR carrier is limited, for example, in frequency range 1, a maximum bandwidth of one NR carrier is 100 MHz. On the other hand, the spectrum of the operator is limited, and the spectrum of a single carrier may not reach the maximum bandwidth supported by the protocol. In order to further improve the positioning accuracy, one method is to jointly use multiple positioning signals to support a positioning function. Optionally, the multiple positioning signals may be in different frequency resources, and may also be in different carriers. The method for joint use can include various implementations, for example, it can be referred to as an aggregation processing method (aggregation for short), or positioning signals in different carriers are considered jointly to be an "equivalent" signal with a larger bandwidth, i. e. measurement is performed on "aggregated signal" obtained from aggregation of signals. According to various implementations of joint use of multiple positioning signals, there can be aggregation of NR positioning frequency layers, aggregation of DL PRS, aggregation of DL PRS resources, aggregation of DL PRS, and aggregation of DL PRS in one or more positioning frequency layers. The wording "aggregation" can also be expressed in other forms, such as bundling, bundling in frequency domain, joint reception, etc., which will not be elaborated herein. The name and implementation scheme of the method of joint use of multiple positioning signals are not limited herein.

For aggregation of two DL positioning signals, the UE needs to receive two signals directly at a larger sampling rate, which is equivalent to receiving the two signals as an equivalent signal occupying a larger frequency domain resource, but cannot simply divide the signals into two paths with each path respectively receives one DL positioning signal.

This method has a high requirement on time synchronization errors and continuous phases of two carriers, and has a high latency requirement on a signal sender and a signal measuring end. According to a specific frequency band and bandwidth, a UE may need to use a larger sampling rate to implement aggregation. Since aggregation has a relatively high requirement for product implementation, a reasonable UE capability reporting mechanism needs to be designed, so that on the one hand, under the limitation of a UE capability condition, aggregation is supported as far as possible, and on the other hand, too high requirement for UE capability needs to be avoided, otherwise, a commercial terminal cannot be realized. At present, there is no design scheme for relevant UE capability.

For ease of description, the "positioning signal" and the "positioning signal resource" are used interchangeably. For example, when the wording "positioning signal" is used, it may also refer to the positioning signal resource.

Technical schemes according to implementations of the disclosure is applicable to various communication systems, such as a global system of mobile communication (GSM) system, a code division multiple access (CDMA) system, a wideband code division multiple access (WCDMA) system, a general packet radio service (GPRS) system, a long term evolution (LTE) system, an advanced long term evolution (LTE-A) system, a new radio (NR) system, an advanced system of NR system, a LTE-based access to unlicensed spectrum (LTE-U) system, a NR-based access to unlicensed spectrum (NR-U) system, a non-terrestrial network (NTN) system, a universal mobile telecommunication system (UMTS), a wireless local area network (WLAN), a wireless fidelity (WiFi) system, a 5th-generation (5G) system, and other systems.

Generally, a conventional communication system supports a limited number of connections and is easy to implement. However, with the development of communication technologies, the mobile communication system will support not only traditional communication, but will also support, for example, device to device (D2D) communication, machine to machine (M2M) communication, machine type communication (MTC), vehicle to vehicle (V2V) communication, or vehicle to everything (V2X) communication, etc., and the implementations of the disclosure can also be applied to these communication systems.

Optionally, the communication system in implementations of the disclosure may be applied to a carrier aggregation (CA) scenario, may also be applied to a dual connectivity (DC) scenario, and may also be applied to a standalone (SA) network deployment scenario.

Optionally, the communication system in the implementations of the disclosure may be applied to an unlicensed spectrum, where the unlicensed spectrum may also be considered as a shared spectrum. Alternatively, the communication system in the implementations of the disclosure may also be applied to a licensed spectrum, where the licensed spectrum may also be considered as a non-shared spectrum.

Implementations of the disclosure are described in conjunction with a network device and a terminal device. The terminal device may also be referred to as a user equipment (UE), an access terminal, a user unit, a user station, a mobile station, a mobile station, a remote station, a remote terminal, a mobile device, a user terminal, a terminal, a wireless communication device, a user agent, a user device, or the like.

The terminal device may be a station (ST) in a WLAN, a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

In implementations of the disclosure, the terminal device can be deployed on land, which includes indoor or outdoor, handheld, wearable, or in-vehicle. The terminal device can also be deployed on water (such as ships, etc.). The terminal device can also be deployed in the air (such as airplanes, balloons, satellites, etc.).

In implementations of the disclosure, the terminal device can be a mobile phone, a pad, a computer with wireless transceiver functions, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

By way of explanation rather than limitation, in implementations of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In implementations of the disclosure, the network device may be a device configured to communicate with a mobile device, and the network device may be an access point (AP) in a WLAN, a base transceiver station (BTS) in GSM or CDMA, may also be a Node B (NB) in WCDMA, and may also be an evolutional Node B (eNB or eNodeB) in LTE, or a relay station or AP, or an in-vehicle device, a wearable device, a network device (g-Node B (gNB)) in an NR network, or a network device in a future evolved PLMN, etc.

By way of explanation rather than limitation, in implementations of the disclosure, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station deployed on land or water.

In implementations of the disclosure, the network device provides services for a cell, and the terminal device communicates with the network device on a transmission resource (for example, a frequency-domain resource or a spectrum resource) for the cell. The cell may be a cell corresponding to the network device (for example, a base station). The cell may correspond to a macro base station, or may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

Figure 2:
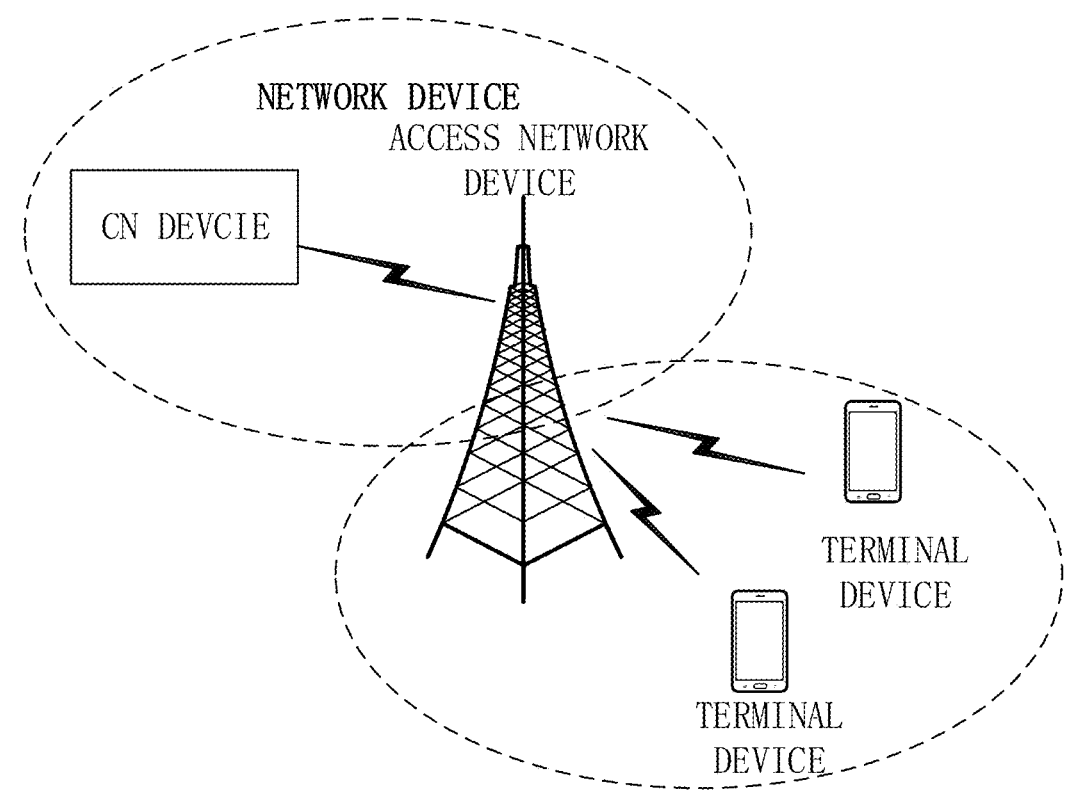
FIG. 2 is a system architecture of a communication system to which implementations of the disclosure are applied.

FIG. 2 is a system architecture diagram of a communication system to which implementations of the disclosure is applied. The communication system may include a network device, and the network device may be a device that communicates with a terminal device (or referred to as a communication terminal or a terminal). A network device may provide communication coverage for a particular geographic and may communicate with terminal devices located within that coverage. The network device may also be a device such as a server (for example, a location server). FIG. 2 exemplarily illustrates a network device and two terminal devices. Optionally, the communication system may comprise multiple network devices, and other numbers of terminal devices may be in the coverage of each network device. The implementations of the disclosure are not limited thereto. Alternatively, the communication system can further include other network entities such as a network controller and a mobility management entity, which is not limited in the implementation of the disclosure.

The network device may further include an access network device and a core network device. That is, the wireless communication system may further include multiple core networks in communication with the access network device. The access network device may be an evolutional node B (which may be an eNB or an e-node B for short) macro base station, a micro base station (also referred to as a "small base station"), a pico base station, an access point (AP), a transmission point (TP) or a new generation node B (evolved node B, which may be an eNB or an e-node B for short) in a long-term evolution (LTE) system, a next radio (NR) system or an authorized auxiliary access long-term evolution (LAA-LTE) system, or the like.

It should be understood that a device having a communication function in a network/system in implementations of the disclosure may be referred to as a communication device. Taking the communication system shown in FIG. 2 as an example, the communication device may include a network device having a communication function and a terminal device, where the network device and the terminal device may be specific devices described in implementations of the disclosure, which are not described herein again. The communication device may also include other devices in the communication system, such as a network controller, a mobility management entity, and other network entities. The implementations of the disclosure are not limited thereto.

Disclosed herein are implementations of methods for reporting positioning capability, terminal devices, network devices, and a computer readable storage medium, to achieve user equipment (UE) capability report for a solution where multiple positioning signals are jointly used to support positioning function.

Figure 3:
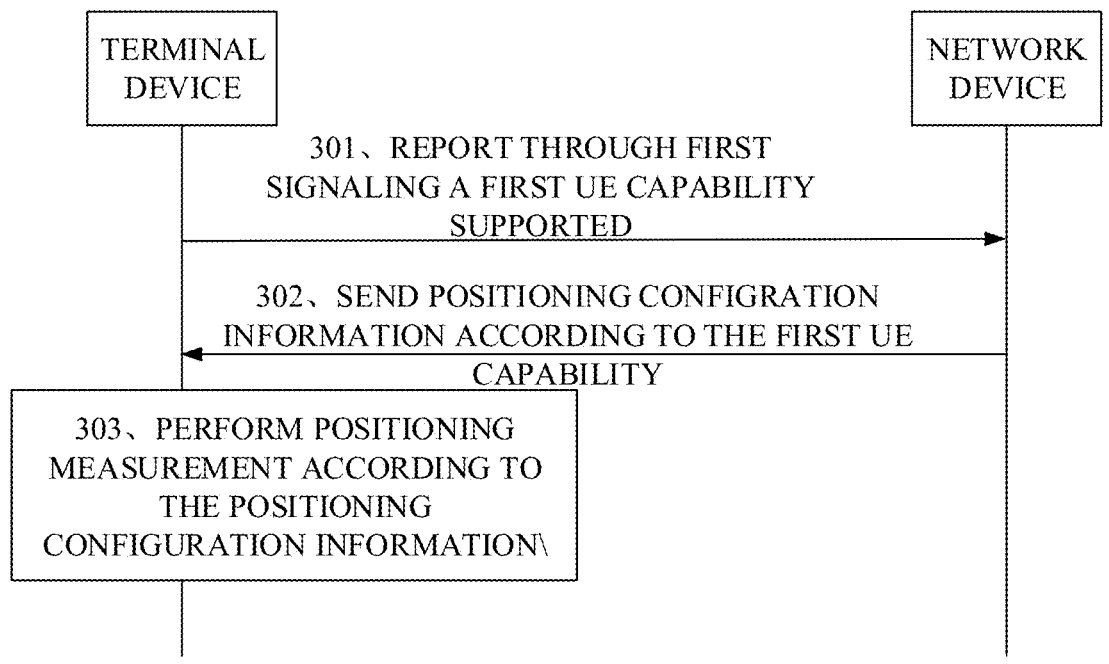
FIG. 3 is a schematic diagram of a method for reporting positioning capability according to an implementation of the disclosure.

Technical solutions of the disclosure are further described in implementations of the disclosure. FIG. 3 is schematic diagram illustrating a method for reporting positioning capability, which includes the following, and can achieve reporting UE capability with regard to a scheme where positioning function is supported by joint use of multiple positioning signals.

301, a terminal device reports through a first signaling to a network device a first UE capability. The first UE capability is a positioning function based on joint use of multiple downlink (DL) positioning signals. Optionally, the network device receives the first UE capability reported by the terminal device through the first signaling.

1. The terminal device reports the first UE capability to the network device through the first signaling, where the first UE capability is a positioning function based on joint use of DL positioning signals. It should be noted that, the first UE capability is a new capability, which is possible to make the UE to support a signal for positioning with a larger "equivalent bandwidth", and the larger "equivalent bandwidth" can improve the positioning accuracy. By introducing the new capability, it can make a high-capability terminal device to provide better positioning performance.

1.1. Optionally, the first signaling belongs to a UE capability report signaling (UE capability signaling). It should be noted that, the UE capability signaling may include LTE positioning protocol (LPP) signaling, radio resource control (RRC) signaling, and the like.

1.2. Optionally, the first signaling may include LPP signaling. That is, the first signaling is transmitted via LPP. In this way, existing protocol procedures can be used, and a standardization workload is small.

Optionally, the DL positioning signal may include a DL positioning reference signal (PRS), may also include a SS/PBCH block, and may also include a channel state information reference signal (CSI-RS). In the following, for ease of description, sometimes "PRS" is used to refer to the DL positioning signal.

Optionally, the network device is a location server.

Optionally, 1) the first signaling is carried in resource capability of NR DL positioning reference signal (NR-DL-PRS-ResourcesCapability).

Alternatively, 2) the first signaling is carried in resource capability per band in a DL positioning reference signal (DL-PRS-ResourcesCapabilityPerBand).

Alternatively, 3) the first signaling is carried in capability of a positioning method of NR DL time difference of arrival (TDOA) (NR-DL-TDOA-ProvideCapabilities).

Alternatively, 4) the first signaling is carried in measurement capability of a positioning method of NR DL TDOA (NR-DL-TDOA-MeasurementCapability).

Alternatively, 5) the first signaling is carried in provide capability of a positioning method of NR DL angle of departure (AOD) (NR-DL-AoD-ProvideCapabilities).

Alternatively, 6) the first signaling is carried in measurement capability of a positioning method of NR DL AOD (NR-DL-AoD-MeasurementCapability).

Alternatively, 7) the first signaling is carried in provide capability of a positioning method of NR multiple round trip time (RTT) (NR-Multi-RTT-ProvideCapabilities).

Alternatively, 8) the first signaling is carried in measurement capability of a positioning method of NR multiple round trip time (RTT) (NR-Multi-RTT-MeasurementCapability).

Exemplary, the first signaling is transmitted through NR-DL-PRS-ResourcesCapability, which is an existing NR positioning information element. Unless indicated explicitly, names of the "existing NR positioning information element" used herein refer to names of NR positioning information element mentioned in TS 37.355: LPP (Release 16). It should be noted that, the names of the NR positioning information element may remain unchanged, but the contents of the NR positioning information element should be amended or added according to new information mentioned in this disclosure.

1.3. Optionally, the first signaling includes RRC signaling. In this way, a new signaling is introduced for reporting UE capability, which can reduce the delay of reporting positioning capability supported by terminal device.

Optionally, the network device is the serving network device of the terminal device. Optionally, the serving network device is a serving access network device, for example, a serving gNB.

Optionally, 1) the first signaling is carried in resource capability of NR DL positioning reference signal (NR-DL-PRS-ResourcesCapability).

Alternatively, 2) the first signaling is carried in resource capability per band in a DL positioning reference signal (DL-PRS-ResourcesCapabilityPerBand).

Alternatively, 3) the first signaling is carried in capability of a positioning method of NR DL time difference of arrival (TDOA) (NR-DL-TDOA-ProvideCapabilities).

Alternatively, 4) the first signaling is carried in measurement capability of a positioning method of NR DL TDOA (NR-DL-TDOA-MeasurementCapability).

Alternatively, 5) the first signaling is carried in provide capability of a positioning method of NR DL angle of departure (AOD) (NR-DL-AoD-ProvideCapabilities).

Alternatively, 6) the first signaling is carried in measurement capability of a positioning method of NR DL AOD (NR-DL-AoD-MeasurementCapability).

Alternatively, 7) the first signaling is carried in provide capability of a positioning method of NR multiple round trip time (RTT) (NR-Multi-RTT-ProvideCapabilities).

Alternatively, 8) the first signaling is carried in measurement capability of a positioning method of NR multiple round trip time (RTT) (NR-Multi-RTT-MeasurementCapability).

Optionally, the first UE capability indicates a maximum number of joint layers corresponding to joint use of multiple DL positioning signals.

Optionally, the joint layer includes a positioning frequency layer (PFL) or an aggregation layer. That is, the first signaling can indicate a maximum number of a PFLs corresponding to the first UE capability, or a maximum number of aggregation layers of DL positioning signal aggregation that is supported by DL positioning capability. Here, a capability corresponding to the maximum number of layers is described with the term "PFL" or "aggregation layer", it can also be described with other concepts which are not elaborated herein but should be in the scope of this disclosure. Optionally, the PFL can also be referred as a positioning layer.

That is, the first signaling is further configured to indicate a maximum number M of PFLs corresponding to the first UE capability (that is, how many PFLs), or indicate the maximum number N of aggregation layers of signal aggregation. It can be understood that, the terminal device may report the maximum capability to the network device, but the capability configured by the network device may be less than or equal to the maximum capability.

Optionally, the aggregation layer does not necessarily need explicit definition, and may simply be a descriptor introduced for the convenience of describing the signal aggregation capability. For example, if two signals on different frequency-domain resources can be aggregated, it is considered that the number of the aggregation layers corresponding to such aggregation is 2, similarly, if three signals on different frequency-domain resources can be aggregated, it is considered that the number of the aggregation layers corresponding to such aggregation is 3.

It should be noted that, by reporting how many PFLs or how many aggregation layers for aggregation is supported, it is possible to provide better flexibility for terminal device implementation. For example, a high-capability terminal device may support aggregation of more PFLs, and a low-capability terminal device may support aggregation of less PFLs.

2.1. Optionally, different joint layers occupy different frequency domain resources.

Exemplarily, DL positioning signals corresponding to different PFLs are in different frequency domain resources, or DL positioning signals corresponding to different aggregation layers are in different frequency domain resources.

2.2. Optionally, the same joint layer has same values for part or all of the following configuration parameters, which include but not limited to: subcarrier spacing, cyclic prefix, start physical resource block (PRB), comb size, signal bandwidth or resource bandwidth, frequency position information ("frequency" for short) of the reference resource block.

2.3. Optionally, the value of the maximum number of joint layers is 2, 3, or 4.

It can be understood that, the terminal device may report to the network device the maximum number of PFLs corresponding to the first UE capability, or the maximum number of aggregation layers of signal aggregation that can be supported by the first UE capability.

Optionally, the network device receives the maximum number of PFLs corresponding to the first UE capability reported by the terminal device, or the maximum number of aggregation layers of signal aggregation that can be supported by the first UE capability. That is, the terminal device may directly report the maximum number M of PFLs corresponding to the first UE capability, or the maximum number N of aggregation layers of signal aggregation that can be supported by the first UE capability. More flexibility may be provided, and each terminal device may provide more detailed capability indication.

(1) Optionally, the value of the maximum number of joint layers is indicated as 2, 3, or 4 by a first field.
Exemplary, Capability 1 Supported
　　maxLyaer one of {2, 3, 4}

It can be understood that, the value of the maximum number M of PFLs is 2, 3, or 4, or the value of the maximum number N of aggregation layers is 2, 3, or 4.

(2) Optionally, the maximum number of joint layers is indicated by a second field, where the second field indicates that a default value of the maximum number of joint layers is 2, and indicates that a non-default value of the maximum number of joint layers is 3 or 4.
Exemplary, Capability 1 Supported
　　maxLyaer one of {3, 4} (not reported, default value=2)

It can be understood that, the terminal device indicates through the second field the maximum number of PFLs corresponding to the first UE capability or the maximum number of aggregation layers of signal aggregation that can be supported by the first UE capability. When the second field is in a default status, the second field indicates that the maximum number of PFLs or the maximum number of aggregation layers is 2; and when the second field is in a non-default status, the value indicated by the second field is 3 or 4, which represents that the maximum number of PFLs or the maximum number of aggregation layers is 3 or 4.

Compared with scheme (1), the solution of scheme (2) can use fewer bits to indicate the maximum number of joint layers, for example, the first field of scheme (1) needs at least 2 bits, while the second filed of scheme (2) needs at least 1 bit.

(3) Optionally, the terminal device reports the first UE capability supported, when the first UE capability does not indicate the maximum number of joint layers corresponding to the joint use of multiple DL positioning signals, the default maximum number of joint layers is 2.
Exemplary, Capability 1 Supported
　　(default value=2, no need to report the number of layers)

In this implementation, two PFLs or aggregation layers corresponding to the first UE capability is supported by default, compared with the schemes where the maximum number of PFLs or the maximum number of aggregation layers is reported, the signaling overhead of reporting may be reduced.

2.4. The maximum number of joint layers corresponding to the first UE capability and a value of a third UE capability are configured separately, and the value of the third UE capability is reported by the terminal device through a maximum number of positioning layers maxNrOfPosLayer-r16.

It can be understood that, the maximum number M of PFLs corresponding to the first UE capability or the maximum number N of aggregation layers of signal aggregation that can be supported by the first UE capability is configured separately from the value of the third UE capability, where the third UE capability indicates the maximum number of PFLs supported by the terminal device. In this implementation, the first UE capability and the third UE capability are configured separately, which may provide greater flexibility for implementation of the terminal device, so that the terminal device with more correspondence may be designed for a typical application.
maxNrOfPosLayer-r16 Related Protocol is as Follows:
　　maxNrOfPosLayer
　　Indicates the maximum number of supported positioning
　　　layer.

Optionally, the maximum number of joint layers corresponding to the first UE capability is less than or equal to the value of the third UE capability.

That is, it can be understood that, the maximum number M of PFLs corresponding to the first UE capability or the maximum number N of aggregation layers of signal aggregation that can be supported by the first UE capability is less gation that can be supported by the first UE capability is less required. That is, the terminal device can measure each DL positioning signal separately according to an existing manner, and then perform processing according to a certain rule and then report same, that is, measurement results of DL positioning signals in different frequency layers and DL positioning signals in the same frequency layer may be processed similarly.

```
-- ASN1START
NR-DL-PRS-ResourcesCapability-r16 ::= SEQUENCE {
    maxNrOfDL-PRS-ResourceSetPerTrpPerFrequencyLayer-r16
        INTEGER (1..2),
    maxNrOfTRP-AcrossFreqs-r16              ENUMERATED { n4, n6, n12, n16, n32,
            n64, n128, n256, ...},
    maxNrOfPosLayer-r16              INTEGER (1..4),
    dl-PRS-ResourcesCapabilityBandList-r16      SEQUENCE (SIZE (1..nrMaxBands-r16)) OF
    DL-PRS-ResourcesCapabilityPerBand-r16,
    dl-PRS-ResourcesBandCombinationList-r16
    DL-PRS-ResourcesBandCombinationList-r16,
        ...
}
DL-PRS-ResourcesCapabilityPerBand-r16 := SEQUENCE {
    freqBandIndicatorNR-r16              FreqBandIndicatorNR-r16,
    maxNrOfDL-PRS-ResourcesPerResourceSet-r16 ENUMERATED { n1, n2, n4, n8, n16, n32,
n64, ...},
    maxNrOfDL-PRS-ResourcesPerPositioningFrequencylayer-r16
        ENUMERATED { n6, n24, n32, n64, n96, n128,
            n256, n512, n1024, ...},
        ...
}
DL-PRS-ResourcesBandCombinationList-r16 ::= SEQUENCE (SIZE (1..maxBandComb-r16))
OF
            DL-PRS-ResourcesBandCombination-r16
DL-PRS-ResourcesBandCombination-r16 ::= SEQUENCE {
    bandList-r16                  SEQUENCE (SIZE (1..maxSimultaneousBands-r16)) OF
            FreqBandIndicatorNR-r16,
    maxNrOfDL-PRS-ResourcesAcrossA11FL-TRP-ResourceSet-r16
    CHOICE {
        fr1-Only-r16                  ENUMERATED {n6, n24, n64, n128, n192,
            n256, n512, n1024, n2048},
        fr2-Only-r16                  ENUMERATED {n24, n64, n96, n128, n192,
            n256, n512, n1024, n2048},
        fr1-FR2Mix-r16                  SEQUENCE {
        fr1-r16                  ENUMERATED {n6, n24, n64, n96, n128,
            n192, n256, n512, n1024, n2048},
        fr2-r16                  ENUMERATED {n24, n64, n96, n128, n192,
            n256, n512, n1024, n2048},
        ...
    },
        ...
}
-- ASN1STOP
``` than the value of the third UE capability, that is, less than or equal to the value of maxNrOfPosLayer-r16 reported by the terminal device. In this implementation, the values of the above two configurations are restricted, which can avoid a terminal device with poor implementation, for example, a terminal device which supports more PFLs for aggregation but supports less PFLs or aggregation layers for ordinary processing.

Optionally, the value of maxNrOfPosLayer-r16 may be 1, 2, 3, or 4.

Optionally, when the value of maxNrOfPosLayer-r16 is 1, the terminal device does not support first UE capability; optionally, the terminal device does not report to the network device that the terminal device does not support the first UE capability.

Optionally, when the value of maxNrOfPosLayer-r16 is 2, 3, or 4, the terminal device supports the first UE capability.

Optionally, in the current UE capability indication maxNrOfPosLayer-r16, reception of DL positioning signals in multiple PFLs can be supported, but aggregation is not 2.5. Optionally, the maximum value of an aggregation bandwidth of multiple joint layers corresponding to the first UE capability is determined according to a preset protocol, or the maximum value of the aggregation bandwidth of multiple joint layers corresponding to the first UE capability is a default value.

It can be understood that, the maximum bandwidth of DL positioning signals in multiple PFLs or multiple aggregation layers can be specified according to existing protocols (TS 37.355(Rel-16)). That is, the preset protocol can be comprehended as existing protocols (TS 37.355(Rel-16)). In this implementation, the maximum possible signal bandwidth is supported according to the maximum number M of PFLs aggregated or the maximum number N of aggregation layers. For example, according to the existing protocol, if the maximum signal bandwidth that can be supported by the terminal device in one PFL is maxBW, the maximum signal aggregation bandwidth that can be supported for aggregation is M*maxBW or N*maxBW, where the maximum signal aggregation bandwidth can be determined according to calculation of equivalent total bandwidth. As such, the signaling overhead can be saved, and at the same time, a transmitting end can reserve an existing processing manner for each PFL as much as possible, thereby reducing additional limitations and reducing implementation complexity.

The preset protocol 37.355(Rel-16) is as follows:

```
supportedBandwidthPRS-r16        CHOICE {
    fr1               ENUMERATED {mhz5, mhz10, mhz20, mhz40,
                                   mhz50, mhz80, mhz100},
    fr2               ENUMERATED {mhz50, mhz100, mhz200, mhz400},
        ...
    }
```

Existing UE Capability Signaling Configuration:

supportedBandwidthPRS (the PRS bandwidth supported) Indicates the maximum number of DL-PRS bandwidth in MHz, which is supported and reported by UE.

The corresponding solution is: if the supported bandwidth (for example, FR1, which is a low-mid band) reported by the terminal device according to protocol R16 is BW, and if the terminal device supports aggregation and the supported maximum number of aggregation layers is N, the maximum aggregation bandwidth is BW*N.

3. Optionally, the first signaling further indicates first band information. The first band information indicates a band occupied by the first UE capability supported by the terminal device.

In this implementation, the band information is indicated by the first signaling, as such, the fact that the terminal device supports the capability does not require the terminal device to support such capability on all bands supporting positioning. Thus, more degrees of freedom can be provided for the implementation of the terminal device, and at the same time, more terminal devices can support the feature (can support only on some frequency bands).

3.1. Optionally, the first band information comprises one or more band information.

In this implementation, for signal aggregation of PFLs or aggregation layers in a band (intra-band), signaling overhead can be reduced. Since only signal aggregation of PFLs or aggregation layers for intra-band needs to be supported, the implementation complexity of the terminal device can also be reduced.

Optionally, one or more band information can be implemented through a list structure (List) or a sequence structure (SEQUENCE). That is, one or more band information is implemented through a list structure of band information or implemented through a sequence structure of band information.

Optionally, when the first band information includes one or more band information, the one or more band information is transmitted through NR-DL-PRS-ResourcesCapability or DL-PRS-ResourcesCapabilityPerBand.

(1) The band information is transmitted through a positioning information element (NR-DL-PRS-ResourcesCapability).

An example in which the band information is transmitted through the positioning information element (NR-DL-PRS-ResourcesCapability) is given below. This example modifies existing information elements. The modified parts are indicated in bold font (similar to what follows, and no additional description is given). The names used are only for illustration, and can also be in other names (similar to what follows, and no additional description is given).

Exemplary, refer to implementation 3-1, as given below:

```
NR-DL-PRS-ResourcesCapability-r16 := SEQUENCE {
    maxNrOfDL-PRS-ResourceSetPerTrpPerFrequencyLayer-r16
                                            INTEGER (1..2),
    maxNrOfTRP-AcrossFreqs-r16    ENUMERATED { n4, n6, n12, n16, n32,
                                            n64, n128, n256, ...},
    maxNrOfPosLayer-r16                      INTEGER (1..4),
    dl-PRS-ResourcesCapabilityBandList-r16    SEQUENCE (SIZE (1..nrMaxBands-r16)) OF
    DL-PRS-ResourcesCapabilityPerBand-r16,
    dl-PRS-ResourcesBandCombinationList-r16
    DL-PRS-ResourcesBandCombinationList-r16,
      AggregationCapableBandList        SEQUENCE (SIZE (1..maximum size value)) OF
                                        bandInfomation,
            ...
    }
```

"AggregationCapableBandList" represents a list of band aggregation capability.

"bandInfomation" represents band information.

Optionally, the added part in bold font is optional.

Optionally, "bandInfomation" can be represented in different manner, may be one of the following.

i. The value of "bandInfomation" is A, which corresponds to the band corresponding to the A-th (or the (A+1)-th) element in the sequence structure in "dl-PRS-ResourcesCapabilityBandList" (underlined part). In this implementation, the band where the terminal device can support positioning is generally less than the maximum range and therefore, the signaling report overhead can be reduced.

ii. The value A of "bandInfomation" corresponds to a NR band indicator, where A is an integer and $1 \leq A \leq 1024$. In this implementation, the size of the signaling field is fixed, which can avoid dynamic change of the number of bits of the field and reduce process complexity.

Optionally, the NR band indicator corresponding to "bandInfomation" is also indicated in some element of "dl-PRS-ResourcesCapabilityBandList".

Optionally, the "AggregationCapableBandList" can be the first signaling per se, and the first UE capability supported by the first terminal device is indicated by "AggregationCapableBandList". In this way, the signaling report overhead can be reduced.

(2) The band information is transmitted through a positioning information element (DL-PRS-ResourcesCapabilityPerBand).

An example in which the band information is transmitted through the positioning information element (DL-PRS-ResourcesCapabilityPerBand) is given below.

Exemplary, refer to implementation 3-2, as given below:

```
DL-PRS-ResourcesCapabilityPerBand-r16 := SEQUENCE {
        freqBandIndicatorNR-r16                          FreqBandIndicatorNR-r16,
        maxNrOfDL-PRS-ResourcesPerResourceSet-r16 ENUMERATED { n1, n2, n4, n8,
    n16, n32, n64, ...},
              maxNrOfDL-PRS-ResourcesPerPositioningFrequencylayer-r16
                      ENUMERATED {n6, n24, n32, n64, n96, n128,
                                  n256, n512, n1024, ...},
    AggregationCapability                            Type,
    ...
    }
```

"AggregationCapability" refers to aggregation capability. Optionally, the added part in bold font is optional.

Optionally, "AggregationCapability" and "Type" may be implemented as follows.

1) "Type" has two alternative values, that is, a1 and a2, which represents supporting aggregation capability and not supporting aggregation capability respectively.

2) If "AggregationCapability" is not configured, the first terminal device does not support the first UE capability, and if "AggregationCapability" is configured, for example, the value of "Type" is "supported", the first terminal device supports the first UE capability. In this implementation, the signaling report overhead can be reduced.

Optionally, the "AggregationCapability" can be the first signaling per se, and the first UE capability supported by the first terminal device is indicated by "AggregationCapability". In this way, the signaling report overhead can be reduced.

In the above example, the type corresponding to new fields can be simply represented by "Type" or "type". Similar processing applies to subsequent implementations, and will not be explained one by one.

3.2. Optionally, the first band information includes one or more band-combination information.

In this implementation, more band-combination situations can be supported, and it is convenient for operators to support various complicated available band situations.

Optionally, one or more band-combination information is implemented through a list structure (List) or a sequence structure (SEQUENCE). That is, one or more band information is implemented through a list structure of band-combination information, or implemented through a sequence structure of band-combination information.

Optionally, when the first band information includes one or more band-combination information, one or more band-combination information is transmitted through NR-DL-PRS-ResourcesCapability. That is, the band-combination information is transmitted through a positioning information element (NR-DL-PRS-ResourcesCapability).

The following is an example where the band-combination information is transmitted through the positioning information element (NR-DL-PRS-ResourcesCapability). This example modifies existing information elements. The modified parts are indicated in bold font (similar to what follows, and no additional description is given). The names used are only for illustration, and can also be in other names.

Exemplary, refer to implementation 3-3, as given below:

```
NR-DL-PRS-ResourcesCapability-r16 := SEQUENCE {
          maxNrOfDL-PRS-ResourceSetPerTrpPerFrequencyLayer-r16
                                        INTEGER (1..2),
          maxNrOfTRP-AcrossFreqs-r16        ENUMERATED {n4, n6, n12, n16, n32,
                                        n64, n128, n256, ...},
          maxNrOfPosLayer-r16               INTEGER (1..4),
    dl-PRS-ResourcesCapabilityBandList-r16    SEQUENCE (SIZE (1..nrMaxBands-r16)) OF
    DL-PRS-ResourcesCapabilityPerBand-r16,
    dl-PRS-ResourcesBandCombinationList-r16
    DL-PRS-ResourcesBandCombinationList-r16,
    AggregationCapableBandCombinationList        SEQUENCE (SIZE (1..maximum size
    value)) OF bandCombinationInfomation,
              ...
    }
```

"AggregationCapableBandCombinationList" represents a list of band-combination aggregation capability.

"bandCombinationInfomation" represents band-combination information.

Optionally, the added part in bold font is optional.

Optionally, "bandCombinationInfomation" can be represented in different ways (may be one of the following). Two bands are described as an example, but the scheme can be expanded to more bands.

1) bandCombinationInfomation indicates two values, A1 and A2, which corresponds to a band corresponding to the A1-th (or (A 1+1)-th) element and the A2-th (or (A2+1)-th) element in the sequence structure in dl-PRS-ResourcesCapabilityBandList (underlined part) respectively. In this implementation, since the band on which the terminal device supports positioning is generally less than the maximum range, the signaling report overhead can be reduced.

2) bandCombinationInfomation indicates two values, A1 and A2, each value corresponds to a NR band indicator and is an integer greater than or equal to 1 and less than or equal to 1024. In this implementation, the size of the signaling field is fixed, which can avoid dynamic change of the number of bits of the field and reduce process complexity.

Optionally, the NR band indictor corresponding to "band-CombinationInfomation" is also indicated in some element in "dl-PRS-ResourcesCapabilityBandList".

Optionally, "AggregationCapableBandCombinationList" can be the first signaling per se, and the first UE capability supported by the first terminal device is indicated by "AggregationCapableBandCombinationList". In this implementation, the signaling report overhead can be reduced.

4. Optionally, the terminal device reports through the first signaling or a signaling other than the first signaling, to the network device the maximum value of the joint bandwidth of multiple joint layers corresponding to the first UE capability.

Exemplary, when the maximum value of the joint bandwidth is indicated by the first signaling, it can be achieved as follows: 1) there is a general field in the first signaling to indicate the maximum value of the joint bandwidth of each joint layer; or 2) for a joint layer, the maximum value of the joint bandwidth of this joint layer is indicated in the configuration information of this joint layer in the first signaling.

The maximum value of the joint bandwidth of multiple joint layers corresponding to the first UE capability can also be referred to as the maximum aggregation bandwidth of multiple joint layers corresponding to the first UE capability.

Optionally, the maximum aggregation bandwidth of the multiple joint layers corresponding to the first UE capability can be configured at each band.

In this implementation, the maximum aggregation bandwidth capability is introduced, which can provide more flexibility for UE implementation. That is, terminal devices with different capability levels may report different maximum aggregation bandwidth capabilities, and may provide more diversified terminal devices to be applicable to various application scenarios and services.

4.1. Optionally, when the terminal device supports aggregation of multiple DL positioning signals, the maximum value of the joint bandwidth corresponds to the maximum equivalent total bandwidth of multiple DL positioning signals.

Optionally, the equivalent total bandwidth is a first equivalent total bandwidth or a second equivalent total bandwidth.

(1) The first equivalent total bandwidth is a sum of bandwidths of DL positioning signals in different joint layers.

It can be understood that, the first equivalent total bandwidth is the sum of bandwidths of DL positioning signals in different PFLs or different aggregation layers. That is, the equivalent total bandwidth of multiple DL positioning signals is the sum of bandwidth of DL positioning signals in different PFLs or different aggregation layers (which can be referred to as a first type of equivalent total bandwidth. In the following, the "first type of equivalent total bandwidth" and the "first equivalent total bandwidth" can be used interchangeably without distinction). In this implementation, only the actual bandwidth of the positioning signal is considered, so that requirements for the terminal device can be further improved, and positioning accuracy requirement can be further improved.

Figure 4A:
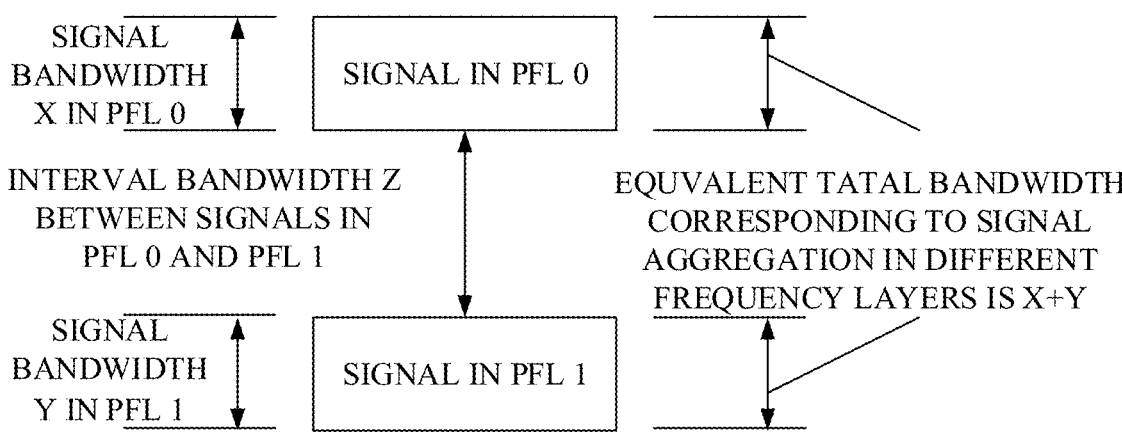
FIG. 4A is a schematic diagram of an equivalent total bandwidth after aggregation of positioning reference signals (PRSs) in two positioning frequency layers according to an implementation of the disclosure.

Exemplary, reference is made to implementation 3-4 as illustrated in FIG. 4A, which is a schematic diagram of an equivalent total bandwidth after aggregation of DL positioning signals in two PFLs.

Two PFLs or aggregation layers are described as an example, but the scheme can be expanded to more PFLs or aggregation layers. It is assumed that a DL positioning signal bandwidth in PFL 0 is X (the unit thereof may use various units corresponding to the frequency domain, for example, may be RB, or hertz, or megahertz (MHz), which is not limited herein. When units of a bandwidth or other frequency domain resources is involved subsequently, the units have similar meanings and will not be described in further detail). If a bandwidth of a DL positioning signal in PFL 1 is Y, an equivalent total bandwidth after aggregation of DL positioning signals in two PFLs is X+Y.

(2) The second equivalent total bandwidth is a bandwidth between the lowest frequency position and the highest frequency position occupied by DL positioning signals in different joint layers.

It can be understood that, the second equivalent total bandwidth is a bandwidth between the lowest frequency position and the highest frequency position occupied by DL positioning signals in different PFLs or different aggregation layers. That is, the equivalent total bandwidth of multiple DL positioning signals is the bandwidth between the lowest frequency position and the highest frequency position occupied by DL positioning signals in different PFLs or different aggregation layers (if there is an interval between DL positioning signal frequencies in different PFLs or different aggregation layers, the interval is also included in the bandwidth) (which can be referred to as a second type of equivalent total bandwidth. In the following, the "second type of equivalent total bandwidth" and the "second equivalent total bandwidth" can be used interchangeably without distinction). In this implementation, all the bandwidth spanned by aggregated signals are considered and therefore, can be closer to the actual hardware implementation, which can reduce the processing requirements for terminal devices, provide greater flexibility for terminal device implementation, and allow more terminal devices to support this feature.

Figure 4B:
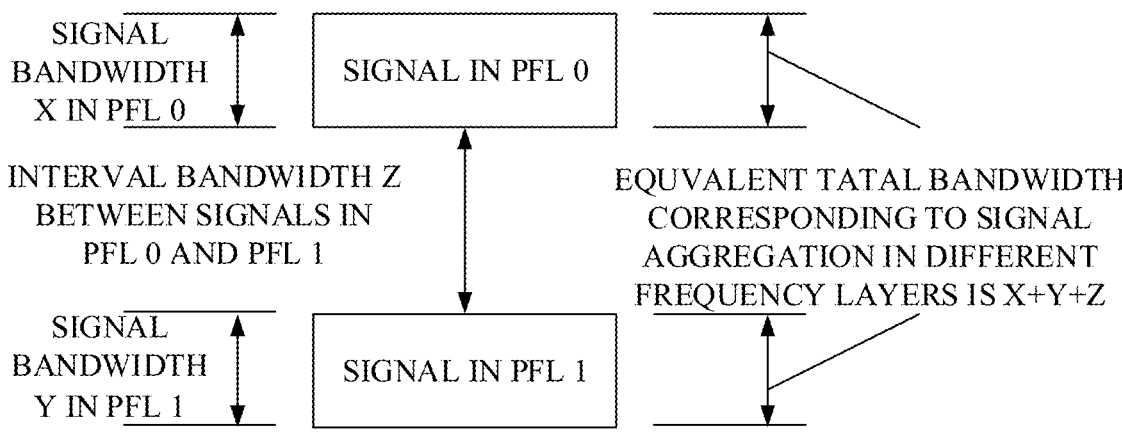
FIG. 4B is another schematic diagram of an equivalent total bandwidth after aggregation of PRSs in two positioning frequency layers according to an implementation of the disclosure.

Exemplary, reference is made to implementation 3-5. FIG. 4B is another schematic diagram of an equivalent total bandwidth after aggregation of DL positioning signals in two positioning frequency layers according to an implementation of the disclosure, as illustrated below.

Two bands are described as an example, but the scheme can be expanded to more bands. For example, if the bandwidth of a DL positioning signal in PFL 0 is X, the bandwidth of a DL positioning signal in PFL 1 is Y, and a bandwidth interval between DL positioning signals in PFL 0 and PFL 1 is Z, the equivalent total bandwidth after aggregation of DL positioning signals in two PFLs is X+Y+Z.

(3) Optionally, the terminal device sends report information to the network device, and the report information indicates a first equivalent total bandwidth or a second equivalent total bandwidth corresponding to the equivalent total bandwidth. Optionally, the network device receives the report information from the terminal device.

That is, the terminal device can indicate, through the report information, whether "the first type of equivalent total bandwidth" or "the second type of equivalent total bandwidth" is used. The report information can be the first signaling or a separate signaling, which is not limited herein.

Optionally, when the corresponding information is reported by the terminal device, it indicates "the first type of equivalent total bandwidth" or "the second type of equivalent total bandwidth".

Optionally, when the corresponding information is not reported by the terminal device, it indicates "the first type of equivalent total bandwidth" or "the second type of equivalent total bandwidth".

The following is an example in which the report information is transmitted through the positioning information element (DL-PRS-ResourcesCapabilityPerBand-r16). This example modifies existing information elements. The modified parts are indicated in bold font (similar to what follows, and no additional description is given). The names used are only for illustration, and can also be in other names.

Exemplary, refer to implementation 3-6, as given below:

```
DL-PRS-ResourcesCapabilityPerBand-r16 ::= SEQUENCE {
        freqBandIndicatorNR-r16                  FreqBandIndicatorNR-r16,
        maxNrOfDL-PRS-ResourcesPerResourceSet-r16    ENUMERATED { n1, n2, n4, n8,
n16, n32, n64, ...},
        maxNrOfDL-PRS-ResourcesPerPositioningFrequencylayer-r16
                                ENUMERATED { n6, n24, n32, n64, n96, n128,
                                             n256, n512, n1024, ...},
    AggregationBandwidthType                 Type,
        ...
    }
```

"AggregationBandwidthType" represents the type of aggregation bandwidth.

Optionally, the added part in bold font is optional.

Optionally, "AggregationBandwidthType" and "Type" can be represented in different manners (may be one of the following manners).

1) AggregationBandwidthType indicates to values A1 and A2, which corresponds to "the first type of equivalent total bandwidth" and "the second type of equivalent total bandwidth" respectively.

Optionally, the "AggregationBandwidthType" can be the first signaling per se, and used to indicate that the terminal 3) When no "AggregationBandwidthType" is reported, correspond to the "second type of equivalent total bandwidth" by default; when the "AggregationBandwidthType" is reported (for example, the value is "supported"), correspond to the "first type of equivalent total bandwidth". In this implementation, the signaling report overhead can be reduced.

4) Optionally, the report information can include a first value or a second value. The first value indicates that the equivalent total bandwidth is the first equivalent total bandwidth, and the second value indicates that the equivalent total bandwidth is the second equivalent total bandwidth.

Optionally, the first terminal device may report value x1 or x2, where x1 and x2 corresponds to the "first type of equivalent total bandwidth" and the "second type of equivalent total bandwidth" respectively.

The following is an example in which the report information is transmitted through the positioning information element "NR-DL-PRS-ResourcesCapability". This example modifies existing information elements. The modified parts are indicated in bold font (similar to what follows, and no additional description is given). The names used are only for illustration, and can also be in other names.

Exemplary, refer to implementation 3-7, as given below:

```
NR-DL-PRS-ResourcesCapability-r16 := SEQUENCE {
        maxNrOfDL-PRS-ResourceSetPerTrpPerFrequencyLayer-r16
                                          INTEGER (1..2),
        maxNrOfTRP-AcrossFreqs-r16        ENUMERATED {n4, n6, n12, n16,
                                          n32, n64, n128, n256, ...},
        maxNrOfPosLayer-r16               INTEGER (1..4),
        dl-PRS-ResourcesCapabilityBandList-r16    SEQUENCE (SIZE (1..nrMaxBands-
r16)) OF
        DL-PRS-ResourcesCapabilityPerBand-r16,
        dl-PRS-ResourcesBandCombinationList-r16
        DL-PRS-ResourcesBandCombinationList-r16,
    AggregationBandwidthType                 Type,
        ...
    }
``` device supports the first UE capability. In this way, the signaling report overhead can be reduced.

2) When no "AggregationBandwidthType" is reported, correspond to the "first type of equivalent total bandwidth" by default; when the "AggregationBandwidthType" is reported (for example, the value is "supported"), correspond to the "second type of equivalent total bandwidth". In this implementation, the signaling report overhead can be reduced.

"AggregationBandwidthType" represents the type of aggregation bandwidth.

Optionally, the added part in bold font is optional.

Optionally, "AggregationBandwidthType" and "Type" can be represented in different manners (may be one of the following manners).

1) AggregationBandwidthType indicates two values A1 and A2, which corresponds to "the first type of equivalent total bandwidth" and "the second type of equivalent total bandwidth" respectively.

Optionally, the "AggregationBandwidthType" can be the first signaling per se, and is used to indicate the first UE capability supported by the terminal device. In this way, the signaling report overhead can be reduced.

2) When no "AggregationBandwidthType" is reported, correspond to the "first type of equivalent total bandwidth" by default; when the "AggregationBandwidthType" is reported (for example, the value is "supported"), correspond to the "second type of equivalent total bandwidth. In this combination, the same maximum aggregation bandwidth capability is used, which can reduce the signaling overhead.

The following is an example in which the report information is transmitted through the positioning information element "NR-DL-PRS-ResourcesCapability". This example modifies existing information elements. The modified parts are indicated in bold font (similar to what follows, and no additional description is given). The names used are only for illustration, and can also be in other names.

Exemplary, refer to implementation 3-8, as given below:

```
NR-DL-PRS-ResourcesCapability-r16 ::= SEQUENCE {
        maxNrOfDL-PRS-ResourceSetPerTrpPerFrequencyLayer-r16
                                                INTEGER (1..2),
        maxNrOfTRP-AcrossFreqs-r16              ENUMERATED { n4, n6, n12, n16,
n32, n64, n128, n256, ...},
        maxNrOfPosLayer-r16                     INTEGER (1..4),
        dl-PRS-ResourcesCapabilityBandList-r16  SEQUENCE (SIZE (1..nrMaxBands-
r16)) OF
        DL-PRS-ResourcesCapabilityPerBand-r16,
        dl-PRS-ResourcesBandCombinationList-r16
        DL-PRS-ResourcesBandCombinationList-r16,
    MaxAggregationBandwidth                     Type,
        ...
}
``` implementation, the signaling report overhead can be reduced.

3) When no "AggregationBandwidthType" is reported, correspond to the "second type of equivalent total bandwidth" by default; when the "AggregationBandwidthType" is reported (for example, the value is "supported"), correspond to the "first type of equivalent total bandwidth. In this implementation, the signaling report overhead can be reduced.

5) Optionally, when no report information is transmitted to the network device by the terminal device, the maximum equivalent total bandwidth of the terminal device is the first equivalent total bandwidth or the second total bandwidth by default.

That is, when the terminal device does not report corresponding information, the "first type of equivalent total bandwidth" or the "second type of equivalent total bandwidth" is determined by default. In this implementation, the signaling report overhead can be reduced.

4.2. The maximum value of the joint bandwidth can be indicated by "NR-DL-PRS-ResourcesCapability" or "DL-PRS-ResourcesCapabilityPerBand".

(1) Optionally, the NR positioning information element "NR-DL-PRS-ResourcesCapability" indicates the maximum aggregation bandwidth corresponding to the first UE capability. In this implementation, for each band or band "MaxAggregationBandwidth" represents the maximum aggregation bandwidth.

Optionally, the added part in bold font is optional. Optionally, "Type" can be a numeric type or an enumerated type. The value of "Type" indicates through "MaxAggregationBandwidth" the maximum aggregation bandwidth supported by the terminal. Other implementations have similar meanings and will not be described repeatedly herein.

The "MaxAggregationBandwidth" can be the first signaling per se, and the first UE capability supported by the terminal device is indicated by "MaxAggregationBandwidth". In this implementation, the signaling report overhead can be reduced.

(2) Optionally, NR positioning information element "DL-PRS-ResourcesCapabilityPerBand" indicates the maximum aggregation bandwidth corresponding to the first UE capability. In this implementation, by means of the positioning information element "DL-PRS-ResourcesCapabilityPerBand", when aggregation of different PFLs or aggregation of positioning signals in different aggregation layers of intra-band is supported, the signaling overhead can be reduced. In addition, different capabilities can be provided for different bands, thereby providing flexibility for the implementation of the terminal device, and being able to design a terminal device type adapted to various deployment scenarios.

The following is an example in which the report information is transmitted through the positioning information element "DL-PRS-ResourcesCapabilityPerBand". This example modifies existing information elements. The modified parts are indicated in bold font (similar to what follows, and no additional description is given). The names used are only for illustration, and can also be in other names.

Exemplary, refer to implementation 3-9, as given below:

```
DL-PRS-ResourcesCapabilityPerBand-r16 ::= SEQUENCE {
        freqBandIndicatorNR-r16                         FreqBandIndicatorNR-r16,
        maxNrOfDL-PRS-ResourcesPerResourceSet-r16       ENUMERATED { n1, n2, n4, n8,
                                                        n16, n32, n64, ...},
        maxNrOfDL-PRS-ResourcesPerPositioningFrequencylayer-r16
                                                        ENUMERATED { n6, n24, n32, n64, n96,
                                                        n128, n256, n512, n1024, ...},
    MaxAggregationBandwidth                             Type,
        ...
    }
```

"MaxAggregationBandwidth" represents the maximum aggregation bandwidth.

Optionally, the added part in bold font is optional.

Optionally, the "MaxAggregationBandwidth" can be the first signaling per se, and the first UE capability supported by the first terminal device can be indicated by "MaxAggregationBandwidth", in this way, the signaling report overhead can be reduced.

4.3. Optionally, one or more band-combination information is further used to indicate the maximum equivalent total bandwidth of the terminal device.

Optionally, a signaling corresponding to band-combination information can further indicate the maximum aggregation bandwidth corresponding to the first UE capability. In this implementation, different capabilities are provided for different band-combinations, thereby providing flexibility for implementation of the terminal device, and a terminal device type adaptive to various deployment scenarios can be designed.

Exemplary, refer to implementation 3-10, as given below:

On the basis of implementation 3-3, the "bandCombinationInfomation" does not only indicate information of multiple bands, but also indicate the maximum aggregation bandwidth information corresponding to the first UE capability, for example:

MaxAggregationBandwidth Type,

It should be noted that, in the above implementations, the bandwidth information may refer to the number of RBs, or may refer to how many Hz (hertz) the bandwidth is or other similar bandwidth information, which is not limited herein. The configuration method of MaxAggregationBandwidth in the above implementations can be further expanded, for example, different maximum aggregation information can be configured for different subcarrier spacing.

4.4. Optionally, the method further includes: the terminal device reports to the network device a second UE capability through a second signaling. The second UE capability indicates timing-error related information of the receiving end, and the timing-error related information corresponds to different carriers or different joint layers.

It can be understood that, the terminal device reports the second UE capability through the second signaling. The second UE signaling indicates the timing-error related information of the receiving end in different carriers, different PFLs, or different aggregation layers. In this implementation, more information can be provided to the network side, such that the network side can determine, for a certain positioning service, whether the terminal device needs aggregation of signals in multiple PFLs.

Optionally, the first signaling and the second signaling can be the same signaling or different signaling.

Optionally, the first signaling and the second signaling are carried in the same layer of the same positioning signaling element. That is, the first signaling and the second signaling can be in the same layer of a certain positioning signaling element. It can be understood that, in the above implementation, the added part in bold font for the first signaling may also be used for contents of the second signaling, and will not be repeated here. The positioning signaling element may be NR-DL-PRS-ResourcesCapability or DL-PRS-ResourcesCapabilityPerBand.

302. Optionally, the network device transmits positioning information to the terminal device according to the first UE capability, where the positioning configuration information is used for the terminal device to perform positioning measurement. The terminal device receives the positioning configuration information transmitted by the network device.

303. Optionally, the terminal device performs positioning measurement according to the positioning configuration information.

According to the first UE capability reported by the terminal device, the network device transmits corresponding DL positioning signal (for example, PRS) configuration information and/or other positioning configuration information to the terminal device. The terminal device can perform positioning measurement related operations according to the configuration information of the first network device.

It should be noted that, the above implementations can be combined, and the implementations obtained by combining the foregoing implementations may also be within the scope of protection of the present disclosure. For example, an implementation obtained by combining one or more of implementations {3-4, 3-5, 3-6, 3-7}, and/or one of implementations {3-1, 3-2, 3-3}, and/or one of implementations {3-8, 3-9}; and an implementation obtained by combining one of implementations {3-1, 3-2, 3-3} and one or more of implementations {3-4, 3-5, 3-6, 3-7, 3-8, 3-9}.

In implementations of the disclosure, the terminal device reports through the first signaling to the network device the first UE capability supported by the terminal device, and the first UE capability is a positioning function based on aggregation of DL positioning signals. As such, related UE capability is reported with regard to supporting positioning function by joint use of multiple positioning signals. By means of such new UE capability, the UE can support a signal for positioning with a larger equivalent bandwidth, and the larger bandwidth can improve the positioning accuracy. By introducing the new UE capability, the terminal having high capability can provide better positioning performance. Exemplary, for scenarios of aggregation of multiple PFLs or positioning signals in aggregation layers in Rel-17, a method for UE capability reporting is provided: reporting of UE capability and different ways for calculating the equivalent total bandwidth of aggregated signals; the manner of reporting band information or band-combination information; the manner of reporting the maximum aggregation bandwidth capability; reporting of timing-error corresponding to different aggregation layers or PFLs; and a manner of combining the above various information.

In technical solutions provided in implementations of the disclosure, the terminal device reports through first signaling, to the network device the first UE capability supported, the first UE capability is a positioning function based on joint use of multiple DL positioning signals. UE capability report with regard to a solution where multiple positioning signals are jointly used to support positioning function is thus achieved.

Figure 5:
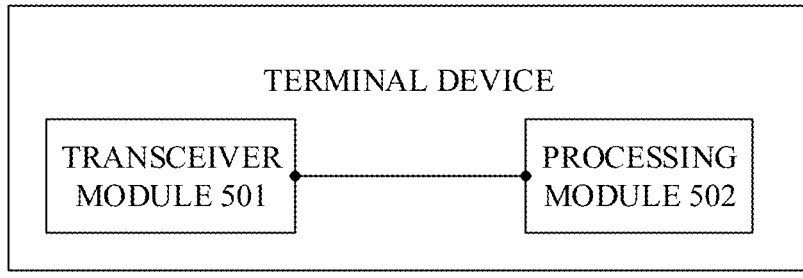
FIG. 5 is a schematic diagram of a terminal device according to an implementation of the disclosure.

FIG. 5 is a schematic diagram of a terminal device according to an implementation of the disclosure. The terminal device includes a transceiver module 501 and a processing module 502.

The transceiver module 501 is configured to report through a first signaling, to a network device a first UE capability supported by the terminal device, where the first UE capability is a positioning function based on joint use of a plurality of downlink (DL) positioning signals.

Optionally, the first UE capability indicates a maximum number of joint layers corresponding to the joint use of the plurality of DL positioning signals.

Optionally, a value of the maximum number of joint layers is 2, 3, or 4.

Optionally, the value of the maximum number of joint layers is indicated as 2, 3, or 4 by a first field and; or the maximum number of joint layers is indicated by a second field, where the second field indicates that a default value of the maximum number of joint layers is 2, and indicates that a non-default value of the maximum number of joint layers is 3 or 4.

Optionally, different joint layers occupy different frequency domain resources.

Optionally, the same joint layer has same values for part or all of the following configuration parameters: subcarrier spacing, cyclic prefix, start physical resource block (PRB), comb size, signal bandwidth or resource bandwidth, and frequency position information of the reference resource block.

Optionally, the maximum number of joint layers is 2 by default, when the first UE capability does not indicate the maximum number of joint layers corresponding to the joint use of the plurality of DL positioning signals.

Optionally, the transceiver module 501 is further configured to report through a second signaling, to the network device a second UE capability, where the second UE capability indicates timing-error information of a receiving end, and the timing-error information corresponds to different carriers or different joint layers.

Optionally, the first signaling and the second signaling are the same signaling or different signaling.

Optionally, the first signaling and the second signaling are carried in a same layer of a same positioning signaling element.

Optionally, the maximum number of joint layers corresponding to the first UE capability and a value of a third UE capability are configured separately, and the value of the third UE capability is reported by the terminal device through a maximum number of positioning layers maxNrOfPosLayer-r16.

Optionally, the maximum number of joint layers corresponding to the first UE capability is less than or equal to the value of the third UE capability.

Optionally, the terminal device does not support the first UE capability when a value of maxNrOfPosLayer-r16 is 1.

Optionally, the first signaling further indicates first band information, and the first band information indicates a band occupied by the first UE capability supported by the terminal device.

Optionally, the first band information comprises one or more band information, or the first band information comprises one or more band-combination information.

Optionally, the one or more band information or the one or more band-combination information is implemented through a list structure or a sequence structure.

Optionally, when the first band information comprises one or more band information, the one or more band information is transmitted through NR-DL-PRS-ResourcesCapability or DL-PRS-ResourcesCapabilityPerBand; when the first band information comprises one or more band-combination information, the one or more band-combination information is transmitted through NR-DL-PRS-ResourcesCapability.

Optionally, a maximum value of a joint bandwidth of a plurality of joint layers corresponding to the first UE capability is determined according to a preset protocol; or the maximum value of the joint bandwidth of the plurality of joint layers corresponding to the first UE capability is a default value; or the transceiver module 501 is further configured to indicate through the first signaling or a signaling other than the first signaling, to the network device the maximum value of the joint bandwidth of the plurality of joint layers corresponding to the first UE capability.

Optionally, when the terminal device supports aggregation of a plurality of DL positioning signals, the maximum value of the joint bandwidth corresponds to a maximum equivalent total bandwidth of the plurality of DL positioning signals.

Optionally, the equivalent total bandwidth is a first equivalent total bandwidth or a second equivalent total bandwidth, the first equivalent total bandwidth is a sum of bandwidths of DL positioning signals in different joint layers, and the second equivalent total bandwidth is a bandwidth between a lowest frequency positon and a highest frequency position occupied by DL positioning signals in different joint layers.

Optionally, the maximum value of the joint bandwidth is indicated by NR-DL-PRS-ResourcesCapability or DL-PRS-ResourcesCapabilityPerBand.

Optionally, the one or more band-combination further indicates a maximum equivalent total bandwidth of the terminal device.

Optionally, the transceiver module 501 is further configured to receive positioning configuration information from a network device, and the processing module 502 is configured to perform positioning measurement according to the positioning configuration information.

Optionally, the first signaling comprise a long term evolution (LTE) positioning protocol (LPP) signaling or a radio resource control (RRC) signaling.

Optionally, when the first signaling comprises the LPP signaling, the network device is a location server; when the first signaling comprises the RRC signaling, the network device is the serving network device of the terminal device.

Optionally, the first signaling is carried in one of:

resource capability of a new radio (NR) DL positioning reference signal (NR-DL-PRS-ResourcesCapability);

resource capability per band in a DL positioning reference signal (DL-PRS-ResourcesCapabilityPerBand);

capability of a positioning method of NR DL time difference of arrival (TDOA) (NR-DL-TDOA-ProvideCapabilities);

measurement capability of a positioning method of NR DL TDOA (NR-DL-TDOA-MeasurementCapability);

provide capability of a positioning method of NR DL angle of departure (AOD) (NR-DL-AoD-ProvideCapabilities);

measurement capability of a positioning method of NR DL AOD (NR-DL-AoD-MeasurementCapability);

provide capability of a positioning method of NR multiple round trip time (RTT) (NR-Multi-RTT-ProvideCapabilities); or measurement capability of a positioning method of NR multiple round trip time (RTT) (NR-Multi-RTT-MeasurementCapability).

Optionally, the joint layer comprises a positioning frequency layer (PFL) or an aggregation layer.

Figures 6, 7:
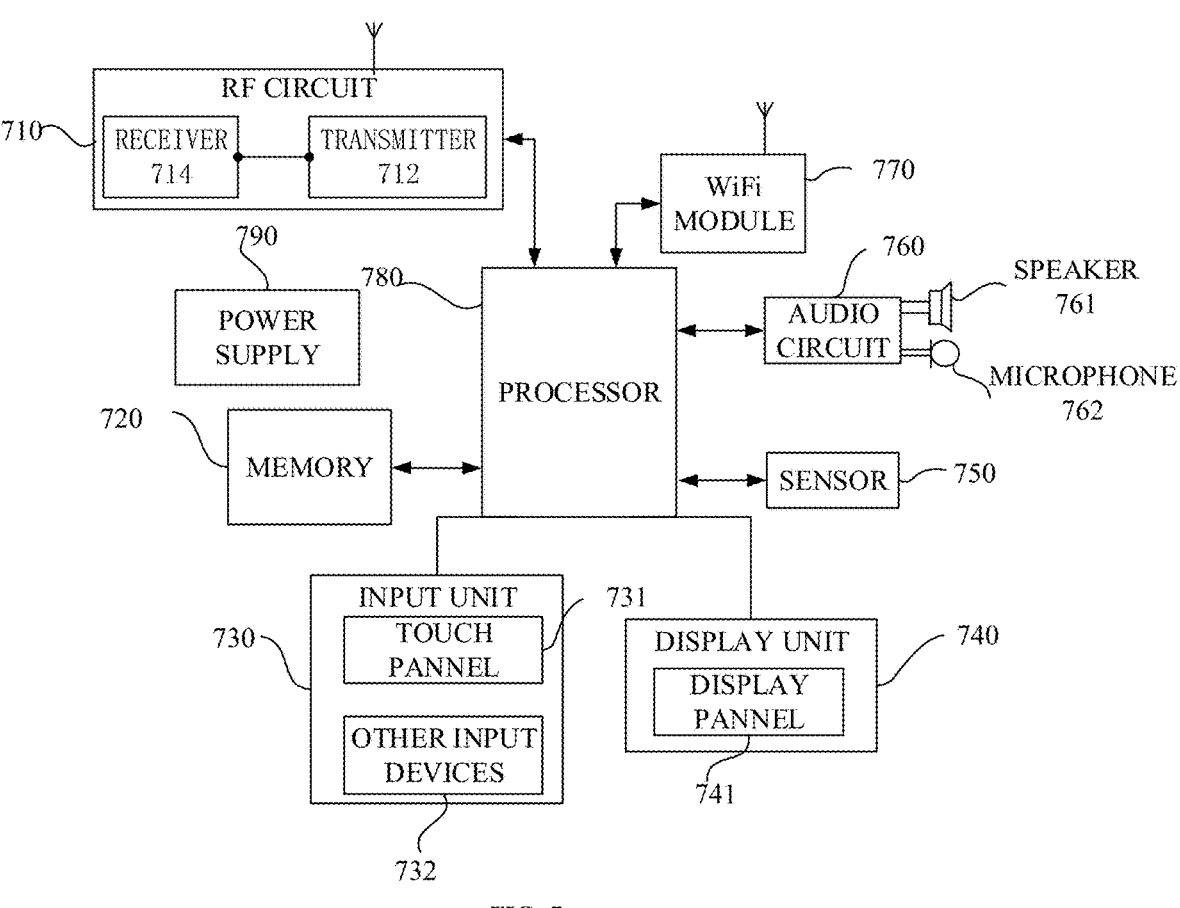
FIG. 6 is a schematic diagram of a network device according to an implementation of the disclosure.
FIG. 7 is another schematic diagram of a terminal device according to an implementation of the disclosure.

FIG. 6 is a schematic diagram of a network device according to an implementation of the disclosure. The terminal device includes a transceiver module 601 and a processing module 602.

Optionally, the transceiver module 601 is configured to receive a first UE capability reported by a terminal device through a first signaling, where the first UE capability is a positioning function based on joint use of a plurality of downlink (DL) positioning signals.

Optionally, the first UE capability indicates a maximum number of joint layers corresponding to the joint use of the plurality of DL positioning signals.

Optionally, a value of the maximum number of joint layers is 2, 3, or 4.

Optionally, the value of the maximum number of joint layers is indicated as 2, 3, or 4 by a first field; or the maximum number of joint layers is indicated by a second field, where the second field indicates that a default value of the maximum number of joint layers is 2, and indicates that a non-default value of the maximum number of joint layers is 3 or 4.

Optionally, different joint layers occupy different frequency domain resources.

Optionally, the same joint layer has same values for part or all of the following configuration parameters: subcarrier spacing, cyclic prefix, start physical resource block (PRB), comb size, signal bandwidth or resource bandwidth, and frequency position information of the reference resource block.

Optionally, the maximum number of joint layers is 2 by default, when the first UE capability does not indicate the maximum number of joint layers corresponding to the joint use of the plurality of DL positioning signals.

Optionally, the transceiver module 601 is further configured to receive a second UE capability reported by the terminal device through a second signaling, where the second UE capability indicates timing-error information of a receiving end, and the timing-error information corresponds to different carriers or different joint layers.

Optionally, the first signaling and the second signaling are the same signaling or different signaling.

Optionally, the first signaling and the second signaling are carried in a same layer of a same positioning signaling element.

Optionally, the maximum number of joint layers corresponding to the first UE capability and a value of a third UE capability are configured separately, and the value of the third UE capability is reported by the terminal device through a maximum number of positioning layers maxNrOfPosLayer-r16.

Optionally, the maximum number of joint layers corresponding to the first UE capability is less than or equal to the value of the third UE capability.

Optionally, the terminal device does not support the first UE capability when a value of maxNrOfPosLayer-r16 is 1.

Optionally, the first signaling further indicates first band information, and the first band information indicates a band occupied by the first UE capability supported by the terminal device.

Optionally, the first band information comprises one or more band information, or the first band information comprises one or more band-combination information.

Optionally, the one or more band information or the one or more band-combination information is implemented through a list structure or a sequence structure.

Optionally, when the first band information comprises one or more band information, the one or more band information is transmitted through NR-DL-PRS-ResourcesCapability or DL-PRS-ResourcesCapabilityPerBand; when the first band information comprises one or more band-combination information, the one or more band-combination information is transmitted through NR-DL-PRS-ResourcesCapability.

Optionally, a maximum value of a joint bandwidth of a plurality of joint layers corresponding to the first UE capability is determined according to a preset protocol; or the maximum value of the joint bandwidth of the plurality of joint layers corresponding to the first UE capability is a default value; or the transceiver module 601 is further configured to receive through the first signaling or a signaling other than the first signaling, the maximum value of the joint bandwidth of the plurality of joint layers corresponding to the first UE capability indicated by the terminal device.

Optionally, when the terminal device supports aggregation of a plurality of DL positioning signals, the maximum value of the joint bandwidth corresponds to a maximum equivalent total bandwidth of the plurality of DL positioning signals.

Optionally, the equivalent total bandwidth is a first equivalent total bandwidth or a second equivalent total bandwidth, the first equivalent total bandwidth is a sum of bandwidths of DL positioning signals in different joint layers, and the second equivalent total bandwidth is a bandwidth between a lowest frequency position and a highest frequency position occupied by DL positioning signals in different joint layers.

Optionally, the maximum value of the joint bandwidth is indicated by NR-DL-PRS-ResourcesCapability or DL-PRS-ResourcesCapabilityPerBand.

Optionally, the one or more band-combination further indicates a maximum equivalent total bandwidth of the terminal device.

Optionally, the transceiver module 601 if further configured to transmit positioning configuration information to the terminal device, where the positioning configuration information is used for positioning measurement of the terminal device.

Optionally, the first signaling comprise a long term evolution (LTE) positioning protocol (LPP) signaling or a radio resource control (RRC) signaling.

Optionally, when the first signaling comprises the LPP signaling, the network device is a location server; when the first signaling comprises the RRC signaling, the network device is the serving network device of the terminal device.

Optionally, the first signaling is carried in one of:

resource capability of a new radio (NR) DL positioning reference signal (NR-DL-PRS-ResourcesCapability);

resource capability per band in a DL positioning reference signal (DL-PRS-ResourcesCapabilityPerBand);

capability of a positioning method of NR DL time difference of arrival (TDOA) (NR-DL-TDOA-ProvideCapabilities);

measurement capability of a positioning method of NR DL TDOA (NR-DL-TDOA-MeasurementCapability);

provide capability of a positioning method of NR DL angle of departure (AOD) (NR-DL-AoD-ProvideCapabilities);

measurement capability of a positioning method of NR DL AOD (NR-DL-AoD-MeasurementCapability);

provide capability of a positioning method of NR multiple round trip time (RTT) (NR-Multi-RTT-ProvideCapabilities); or measurement capability of a positioning method of NR multiple round trip time (RTT) (NR-Multi-RTT-MeasurementCapability).

Optionally, the joint layer comprises a positioning frequency layer (PFL) or an aggregation layer.

Corresponding to the at least one method applied to a terminal device, implementations of the disclosure further provide one or more terminal devices. The terminal device according to implementations of the disclosure may implement any implementation of the foregoing method, as shown in FIG. 7, which is another schematic diagram of a terminal device according to an implementation of the disclosure. The terminal device is illustrated by taking a mobile phone as an example, may include a radio frequency (RF) circuit 710, a memory 720, an input unit 730, a display unit 740, a sensor 750, an audio circuit 760, wireless fidelity (WiFi) module 770, a processor 780, and a power supply 790. The radio frequency circuit 710 includes a receiver 714 and a transmitter 712. Persons skilled in the art can understand that the structure of the mobile phone illustrated in FIG. 7 does not limit the mobile phone, and may include more or fewer components than those shown in the figure, or combine some components, or have different component arrangements.

The following specifically describes each component of the mobile phone with reference to FIG. 7.

The RF circuit 710 is configured to receive and send information or receive and send a signal during a call, and particularly, after receiving DL information from a base station, and send same to the processor 780 for processing. In addition, the RF circuit sends uplink (UL)-related data to the base station. Generally, the RF circuit 710 includes, but is not limited to, an antenna, at least one amplifier, a transceiver, a coupler, a low noise amplifier (LNA), a duplexer, and the like. In addition, the RF circuit 710 may also communicate with a network and another device through wireless communication, where the wireless communication may use any communication standard or protocol, including, but not limited to, global system of mobile communication (GSM), general packet radio service (GPRS), code division multiple access (CDMA), wideband code division multiple access (WCDMA), long term evolution (LTE), email, short messaging service (SMS) and the like.

The memory 720 may be configured to store a software program and a module, and the processor 780 executes various functional applications and data processing of the mobile phone by running the software program and the module stored in the memory 720. The memory 720 may mainly include a program storage area and a data storage area, where the program storage area may store an operating system, an application program required by at least one function (such as a sound playing function and an image playing function), and the like; the data storage area may store data (for example, audio data and a phone book) created according to use of the mobile phone. In addition, the memory 720 may include a high-speed random access memory, and can further include a non-volatile memory, for example, at least one magnetic disk storage device, a flash memory device, or another volatile solid-state storage device.

The input unit 730 may be configured to receive an input digit or character information, and generate a key signal input related to user setting and function control of the mobile phone. Specifically, the input unit 730 may include a touch panel 731 and another input device 732. The touch panel 731, also referred to as a touchscreen, may collect a touch operation performed by a user on or near the touch panel 731 (for example, an operation performed by the user on the touch panel 731 or near the touch panel 731 by using any suitable object or accessory such as a finger or a stylus), and drive a corresponding connection apparatus according to a preset program. Optionally, the touch panel 731 may include two parts: a touch detection apparatus and a touch controller, where the touch detection apparatus detects a touch direction of a user, detects a signal brought by a touch operation, and transmits the signal to the touch controller. The touch controller receives touch information from the touch detection apparatus, converts the touch information into touch coordinates, and then sends the touch coordinates to the processor 780, and can receive and execute a command sent by the processor 780. In addition, the touch panel 731 may be implemented in various types such as a resistive type, a capacitive type, an infrared type, and a surface acoustic wave type. In addition to the touch panel 731, the input unit 730 can further include another input device 732. Specifically, the another input device 732 may include but is not limited to one or more of a physical keyboard, a function key (such as a volume control key or a switch key), a trackball, a mouse, and a joystick, and the like.

The display unit 740 may be configured to display information input by the user or information provided to the user and various menus of the mobile phone. The display unit 740 may include a display panel 741. Optionally, the display panel 741 may be configured in a form such as a liquid crystal display (LCD) or an organic light-emitting diode (OLED). Further, the touch panel 731 may cover the display panel 741. After detecting a touch operation on or near the touch panel 731, the touch panel 731 transmits the touch operation to the processor 780 to determine a type of a touch event, and then the processor 780 provides a corresponding visual output on the display panel 741 according to the type of the touch event. Although in FIG. 7, the touch panel 731 and the display panel 741 serve as two independent components to implement input and output functions of the mobile phone, in some implementations, the touch panel 731 and the display panel 741 may be integrated to implement input and output functions of the mobile phone.

The mobile phone may also include at least one sensor 750, such as a light sensor, a motion sensor, and other sensors. Specifically, the optical sensor may comprise an ambient light sensor and a proximity sensor, where the ambient light sensor may adjust the brightness of the display panel 741 according to the brightness of ambient light, and the proximity sensor may close the display panel 741 and/or backlight when the mobile phone moves to the ear. As one type of motion sensor, an accelerometer sensor can detect the magnitude of acceleration in various directions (generally three axes), and can detect the magnitude and direction of gravity when stationary, and can be used for applications for recognizing a mobile phone posture (for example, switching between landscape and portrait screens, related games, and magnetometer posture calibration), vibration recognition related functions (for example, a pedometer and knocking), and the like. Other sensors such as a gyroscope, a barometer, a hygrometer, a thermometer, and an infrared sensor that may also be configured in the mobile phone are not further described herein.

An audio circuit 760, a loudspeaker 761, and a microphone 762 may provide an audio interface between a user and a mobile phone. The audio circuit 760 may transmit an electrical signal converted from received audio data to the loudspeaker 761, and the loudspeaker 761 converts same into a sound signal and outputs same. On the other hand, the microphone 762 converts a collected sound signal into an electrical signal, the audio circuit 760 receives the electrical signal and converts the electrical signal into audio data, and then outputs the audio data to the processor 780 for processing, and the audio data is sent to, for example, another mobile phone through the RF circuit 710, or the audio data is output to the memory 720 for further processing.

WiFi belongs to a short-distance wireless transmission technology. A mobile phone, via a WiFi module 770, can help a user receive and send an email, browse a web page, access streaming media, and the like, and provides wireless broadband Internet access for the user. Although FIG. 7 shows the WiFi module 770, it should be understood that the WiFi module 770 is not a necessary structure of the mobile phone, and may be omitted as required without changing the essence of the disclosure.

The processor 780 is a control center of the mobile phone, connects various parts of the whole mobile phone by using various interfaces and lines, and executes various functions of the mobile phone and processes data by running or executing a software program and/or a module stored in the memory 720 and invoking data stored in the memory 720, so as to perform overall monitoring on the mobile phone. Optionally, the processor 780 may include one or more processing units. Preferably, the processor 780 may integrate an application processor and a modem processor, where the application processor mainly processes an operating system, a user interface, an application program, and the like, and the modem processor mainly processes wireless communication. It is understandable that the modem processor may not be integrated in the processor.

The mobile phone further comprises a power supply 790 (such as a battery) for supplying power to each component. Preferably, the power supply may be logically connected to the processor 780 through a power supply management system, so as to implement functions such as charging, discharging, and power consumption management through the power supply management system. Although not illustrated, the mobile phone can further include a camera, a Bluetooth module, and the like, which are not described herein again.

In this implementation, the RF circuit 710 is configured to report through a first signaling, to a network device a first UE capability supported by the terminal device, where the first UE capability is a positioning function based on joint use of a plurality of downlink (DL) positioning signals.

Optionally, the first UE capability indicates a maximum number of joint layers corresponding to the joint use of the plurality of DL positioning signals.

Optionally, a value of the maximum number of joint layers is 2, 3, or 4.

Optionally, the value of the maximum number of joint layers is indicated as 2, 3, or 4 by a first field and; or the maximum number of joint layers is indicated by a second field, where the second field indicates that a default value of the maximum number of joint layers is 2, and indicates that a non-default value of the maximum number of joint layers is 3 or 4.

Optionally, different joint layers occupy different frequency domain resources.

Optionally, the same joint layer has same values for part or all of the following configuration parameters: subcarrier spacing, cyclic prefix, start physical resource block (PRB), comb size, signal bandwidth or resource bandwidth, and frequency position information of the reference resource block.

Optionally, the maximum number of joint layers is 2 by default, when the first UE capability does not indicate the maximum number of joint layers corresponding to the joint use of the plurality of DL positioning signals.

Optionally, the RF circuit 710 is further configured to report through a second signaling, to the network device a second UE capability, where the second UE capability indicates timing-error information of a receiving end, and the timing-error information corresponds to different carriers or different joint layers.

Optionally, the first signaling and the second signaling are the same signaling or different signaling.

Optionally, the first signaling and the second signaling are carried in a same layer of a same positioning signaling element.

Optionally, the maximum number of joint layers corresponding to the first UE capability and a value of a third UE capability are configured separately, and the value of the third UE capability is reported by the terminal device through a maximum number of positioning layers maxNrOfPosLayer-r16.

Optionally, the maximum number of joint layers corresponding to the first UE capability is less than or equal to the value of the third UE capability.

Optionally, the terminal device does not support the first UE capability when a value of maxNrOfPosLayer-r16 is 1.

Optionally, the first signaling further indicates first band information, and the first band information indicates a band occupied by the first UE capability supported by the terminal device.

Optionally, the first band information comprises one or more band information, or the first band information comprises one or more band-combination information.

Optionally, the one or more band information or the one or more band-combination information is implemented through a list structure or a sequence structure.

Optionally, when the first band information comprises one or more band information, the one or more band information is transmitted through NR-DL-PRS-ResourcesCapability or DL-PRS-ResourcesCapabilityPerBand; when the first band information comprises one or more band-combination information, the one or more band-combination information is transmitted through NR-DL-PRS-ResourcesCapability.

Optionally, a maximum value of a joint bandwidth of a plurality of joint layers corresponding to the first UE capability is determined according to a preset protocol; or the maximum value of the joint bandwidth of the plurality of joint layers corresponding to the first UE capability is a default value; or the RF circuit 710 is further configured to indicate through the first signaling or a signaling other than the first signaling, to the network device the maximum value of the joint bandwidth of the plurality of joint layers corresponding to the first UE capability.

Optionally, when the terminal device supports aggregation of a plurality of DL positioning signals, the maximum value of the joint bandwidth corresponds to a maximum equivalent total bandwidth of the plurality of DL positioning signals.

Optionally, the equivalent total bandwidth is a first equivalent total bandwidth or a second equivalent total bandwidth, the first equivalent total bandwidth is a sum of bandwidths of DL positioning signals in different joint layers, and the second equivalent total bandwidth is a bandwidth between a lowest frequency positon and a highest frequency position occupied by DL positioning signals in different joint layers.

Optionally, the maximum value of the joint bandwidth is indicated by NR-DL-PRS-ResourcesCapability or DL-PRS-ResourcesCapabilityPerBand.

Optionally, the one or more band-combination further indicates a maximum equivalent total bandwidth of the terminal device.

Optionally, the RF circuit 710 is further configured to receive positioning configuration information from a network device, and the processor 780 is configured to perform positioning measurement according to the positioning configuration information.

Optionally, the first signaling comprise a long term evolution (LTE) positioning protocol (LPP) signaling or a radio resource control (RRC) signaling.

Optionally, when the first signaling comprises the LPP signaling, the network device is a location server; when the first signaling comprises the RRC signaling, the network device is the serving network device of the terminal device.

Optionally, the first signaling is carried in one of:

resource capability of a new radio (NR) DL positioning reference signal (NR-DL-PRS-ResourcesCapability);

resource capability per band in a DL positioning reference signal (DL-PRS-ResourcesCapabilityPerBand);

capability of a positioning method of NR DL time difference of arrival (TDOA) (NR-DL-TDOA-ProvideCapabilities);

measurement capability of a positioning method of NR DL TDOA (NR-DL-TDOA-MeasurementCapability);

provide capability of a positioning method of NR DL angle of departure (AOD) (NR-DL-AoD-ProvideCapabilities);

measurement capability of a positioning method of NR DL AOD (NR-DL-AoD-MeasurementCapability);

provide capability of a positioning method of NR multiple round trip time (RTT) (NR-Multi-RTT-ProvideCapabilities); or measurement capability of a positioning method of NR multiple round trip time (RTT) (NR-Multi-RTT-MeasurementCapability).

Optionally, the joint layer comprises a positioning frequency layer (PFL) or an aggregation layer.

Figure 8:
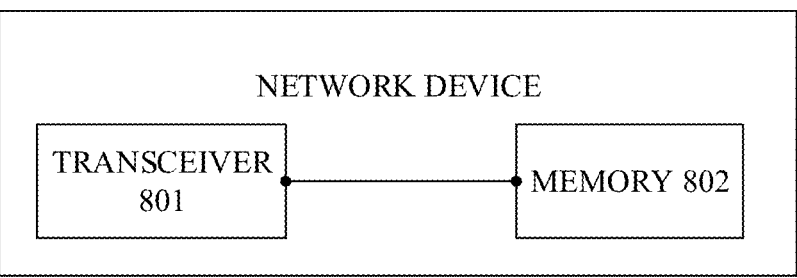
FIG. 8 is another schematic diagram of a network device according to an implementation of the disclosure.

FIG. 8 is another schematic diagram of a network device according an implementation of the disclosure, which includes: a memory 802 storing executable program codes, and a transceiver 801 coupled with the memory.

The transceiver 801 is configured to report through a first signaling, to a network device a first UE capability supported by the terminal device, where the first UE capability is a positioning function based on joint use of a plurality of downlink (DL) positioning signals.

Optionally, the first UE capability indicates a maximum number of joint layers corresponding to the joint use of the plurality of DL positioning signals.

Optionally, a value of the maximum number of joint layers is 2, 3, or 4.

Optionally, the value of the maximum number of joint layers is indicated as 2, 3, or 4 by a first field and; or the maximum number of joint layers is indicated by a second field, where the second field indicates that a default value of the maximum number of joint layers is 2, and indicates that a non-default value of the maximum number of joint layers is 3 or 4.

Optionally, different joint layers occupy different frequency domain resources.

Optionally, the same joint layer has same values for part or all of the following configuration parameters: subcarrier spacing, cyclic prefix, start physical resource block (PRB), comb size, signal bandwidth or resource bandwidth, and frequency position information of the reference resource block.

Optionally, the maximum number of joint layers is 2 by default, when the first UE capability does not indicate the maximum number of joint layers corresponding to the joint use of the plurality of DL positioning signals.

Optionally, the transceiver 801 is further configured to report through a second signaling, to the network device a second UE capability, where the second UE capability indicates timing-error information of a receiving end, and the timing-error information corresponds to different carriers or different joint layers.

Optionally, the first signaling and the second signaling are the same signaling or different signaling.

Optionally, the first signaling and the second signaling are carried in a same layer of a same positioning signaling element.

Optionally, the maximum number of joint layers corresponding to the first UE capability and a value of a third UE capability are configured separately, and the value of the third UE capability is reported by the terminal device through a maximum number of positioning layers maxNrOfPosLayer-r16.

Optionally, the maximum number of joint layers corresponding to the first UE capability is less than or equal to the value of the third UE capability.

Optionally, the terminal device does not support the first UE capability when a value of maxNrOfPosLayer-r16 is 1.

Optionally, the first signaling further indicates first band information, and the first band information indicates a band occupied by the first UE capability supported by the terminal device.

Optionally, the first band information comprises one or more band information, or the first band information comprises one or more band-combination information.

Optionally, the one or more band information or the one or more band-combination information is implemented through a list structure or a sequence structure.

Optionally, when the first band information comprises one or more band information, the one or more band information is transmitted through NR-DL-PRS-ResourcesCapability or DL-PRS-ResourcesCapabilityPerBand; when the first band information comprises one or more band-combination information, the one or more band-combination information is transmitted through NR-DL-PRS-ResourcesCapability.

Optionally, a maximum value of a joint bandwidth of a plurality of joint layers corresponding to the first UE capability is determined according to a preset protocol; or the maximum value of the joint bandwidth of the plurality of joint layers corresponding to the first UE capability is a default value; or the transceiver 801 is further configured to indicate through the first signaling or a signaling other than the first signaling, to the network device the maximum value of the joint bandwidth of the plurality of joint layers corresponding to the first UE capability.

Optionally, when the terminal device supports aggregation of a plurality of DL positioning signals, the maximum value of the joint bandwidth corresponds to a maximum equivalent total bandwidth of the plurality of DL positioning signals.

Optionally, the equivalent total bandwidth is a first equivalent total bandwidth or a second equivalent total bandwidth, the first equivalent total bandwidth is a sum of bandwidths of DL positioning signals in different joint layers, and the second equivalent total bandwidth is a bandwidth between a lowest frequency positon and a highest frequency position occupied by DL positioning signals in different joint layers.

Optionally, the maximum value of the joint bandwidth is indicated by NR-DL-PRS-ResourcesCapability or DL-PRS-ResourcesCapabilityPerBand.

Optionally, the one or more band-combination further indicates a maximum equivalent total bandwidth of the terminal device.

Optionally, the transceiver 801 is further configured to receive positioning configuration information from a network device, and the processor 780 is configured to perform positioning measurement according to the positioning configuration information.

Optionally, the first signaling comprise a long term evolution (LTE) positioning protocol (LPP) signaling or a radio resource control (RRC) signaling.

Optionally, when the first signaling comprises the LPP signaling, the network device is a location server; when the first signaling comprises the RRC signaling, the network device is the serving network device of the terminal device.

Optionally, the first signaling is carried in one of:

resource capability of a new radio (NR) DL positioning reference signal (NR-DL-PRS-ResourcesCapability);

resource capability per band in a DL positioning reference signal (DL-PRS-ResourcesCapabilityPerBand);

capability of a positioning method of NR DL time difference of arrival (TDOA) (NR-DL-TDOA-ProvideCapabilities);

measurement capability of a positioning method of NR DL TDOA (NR-DL-TDOA-MeasurementCapability);

provide capability of a positioning method of NR DL angle of departure (AOD) (NR-DL-AoD-ProvideCapabilities);

measurement capability of a positioning method of NR DL AOD (NR-DL-AoD-MeasurementCapability);

provide capability of a positioning method of NR multiple round trip time (RTT) (NR-Multi-RTT-ProvideCapabilities); or measurement capability of a positioning method of NR multiple round trip time (RTT) (NR-Multi-RTT-MeasurementCapability).

Optionally, the joint layer comprises a positioning frequency layer (PFL) or an aggregation layer.

The implementations described above may be implemented in whole or in part by software, hardware, firmware, or any combination thereof. When implemented using software, it may be implemented in whole or in part in the form of a computer program product including one or more computer instructions. When the computer program instructions are loaded and executed on the computer, the processes or functions according to the implementations of the disclosure are totally or partially generated. The computer may be a general purpose computer, a special purpose computer, a computer network, or other programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (e. g., coaxial cable, fiber, digital subscriber line (DSL)), or wireless (e. g., infrared, wireless, microwave, etc.) manner. The computer readable storage medium may be any available medium that can be stored by a computer, or a data storage device such as a server or a data center that includes one or more available medium entities. The useable medium may be a magnetic medium, (e. g., floppy disk, hard disk, magnetic tape), an optical medium (e. g., DVD), or a semiconductor medium (e. g., solid state disk Solid State Disk (SSD)), or the like.

Terms such as "first", "second", "third", and "fourth" (if present) in the description, claims, and the accompanying drawings of the present disclosure are used to distinguish similar objects, and are not necessarily used to describe a specific sequence or order. It should be understood that the data so used may be interchanged where appropriate so that the implementations described herein may be practiced in an order other than that illustrated or described herein. In addition, the terms "include" and "have", and any variations thereof, are intended to cover a non-exclusive inclusion, for example, a process, method, system, product or apparatus that includes a series of steps or units is not necessarily limited to those steps or units that are expressly listed, but may include other steps or units that are not expressly listed or inherent to such process, method, product or apparatus.

What is claimed is:

1. A method for reporting positioning capability, comprising:

reporting, by a terminal device through a first signaling, to a network device a first user equipment (UE) capability supported by the terminal device, wherein the first UE capability is a positioning function based on joint use of a plurality of downlink (DL) positioning signals, wherein the first UE capability indicates a maximum number of joint layers corresponding to the joint use of the plurality of DL positioning signals, wherein the maximum number of joint layers corresponding to the first UE capability and a value of a third UE capability are configured separately, and the value of the third UE capability is reported by the terminal device through a maximum number of positioning layers maxNrOfPosLayer-r16.

2. The method of claim 1, wherein a value of the maximum number of joint layers is 2, 3, or 4.

3. The method of claim 2, wherein one of the following:

the value of the maximum number of joint layers is indicated as 2, 3, or 4 by a first field and; and the maximum number of joint layers is indicated by a second field, wherein the second field indicates that a default value of the maximum number of joint layers is 2, and indicates that a non-default value of the maximum number of joint layers is 3 or 4.

4. The method of claim 1, wherein different joint layers occupy different frequency domain resources.

5. The method of claim 1, wherein a same joint layer has same values for part or all of the following configuration parameters:

subcarrier spacing, cyclic prefix, start physical resource block (PRB), comb size, signal bandwidth or resource bandwidth, and frequency position information of the reference resource block.

6. The method of claim 1, wherein the maximum number of joint layers corresponding to the first UE capability is less than or equal to the value of the third UE capability.

7. The method of claim 1, wherein the terminal device does not support the first UE capability when a value of maxNrOfPosLayer-r16 is 1.

8. The method of claim 1, further comprising:
receiving, by the terminal device, positioning configuration information from a network device; and
performing, by the terminal device, positioning measurement according to the positioning configuration information.

9. The method of claim 1, wherein the first signaling comprise a long term evolution (LTE) positioning protocol, LPP, signaling or a radio resource control (RRC) signaling.

10. The method of claim 9, wherein:
when the first signaling comprises the LPP signaling, the network device is a location server; and
when the first signaling comprises the RRC signaling, the network device is the serving network device of the terminal device.

11. The method of claim 1, wherein the joint layer comprises a positioning frequency layer (PFL), or an aggregation layer.

12. A terminal device, comprising:
a memory storing executable computer codes; and
a transceiver and a processor coupled with the memory;
wherein the transceiver being configured to report, through a first signaling, to a network device a first user equipment (UE) capability supported by the terminal device, wherein the first UE capability is a positioning function based on joint use of a plurality of downlink (DL) positioning signals,
wherein the first UE capability indicates a maximum number of joint layers corresponding to the joint use of the plurality of DL positioning signals,
wherein the maximum number of joint layers corresponding to the first UE capability and a value of a third UE capability are configured separately, and the value of the third UE capability is reported by the terminal device through a maximum number of positioning layers maxNrOfPosLayer-r16.

13. The terminal device of claim 12, wherein the first signaling further indicates first band information, and the first band information indicates a band occupied by the first UE capability supported by the terminal device.

14. The terminal device of claim 12, wherein one of the following:
a maximum value of a joint bandwidth of a plurality of joint layers corresponding to the first UE capability is determined according to a preset protocol;
the maximum value of the joint bandwidth of the plurality of joint layers corresponding to the first UE capability is a default value; and
the transceiver is further configured to:
indicate, through the first signaling or a signaling other than the first signaling, to the network device the maximum value of the joint bandwidth of the plurality of joint layers corresponding to the first UE capability.

15. The terminal device of claim 14, wherein when the terminal device supports aggregation of a plurality of DL positioning signals, the maximum value of the joint bandwidth corresponds to a maximum equivalent total bandwidth of the plurality of DL positioning signals.

16. The terminal device of claim 15, wherein the equivalent total bandwidth is a first equivalent total bandwidth or a second equivalent total bandwidth, the first equivalent total bandwidth is a sum of bandwidths of DL positioning signals in different joint layers, and the second equivalent total bandwidth is a bandwidth between a lowest frequency position and a highest frequency position occupied by DL positioning signals in different joint layers.

17. The terminal device of claim 12, wherein the first signaling is carried in one of:
resource capability of a new radio (NR) DL positioning reference signal (NR-DL-PRS-ResourcesCapability);
resource capability per band in a DL positioning reference signal (DL-PRS-ResourcesCapabilityPerBand);
capability of a positioning method of NR DL time difference of arrival (TDOA) (NR-DL-TDOA-ProvideCapabilities);
measurement capability of a positioning method of NR DL TDOA (NR-DL-TDOA-MeasurementCapability);
provide capability of a positioning method of NR DL angle of departure (AOD) (NR-DL-AoD-ProvideCapabilities);
measurement capability of a positioning method of NR DL AOD (NR-DL-AoD-MeasurementCapability);
provide capability of a positioning method of NR multiple round trip time (RTT) (NR-Multi-RTT-ProvideCapabilities); or
measurement capability of a positioning method of NR multiple round trip time (RTT) (NR-Multi-RTT-MeasurementCapability).

18. A network device, comprising:
a memory storing executable computer codes; and
a transceiver and a processor coupled with the memory;
wherein the transceiver being configured to receive a first user equipment (UE) capability reported by a terminal device through a first signaling, wherein the first UE capability is a positioning function based on joint use of a plurality of downlink (DL) positioning signals,
wherein the first UE capability indicates a maximum number of joint layers corresponding to the joint use of the plurality of DL positioning signals,
wherein the maximum number of joint layers corresponding to the first UE capability and a value of a third UE capability are configured separately, wherein the value of the third UE capability is reported by the terminal device through a maximum number of positioning layers maxNrOfPosLayer-r16.

19. The network device of claim 18, wherein:
a maximum value of a joint bandwidth of a plurality of joint layers corresponding to the first UE capability is determined according to a preset protocol; or
the maximum value of the joint bandwidth of the plurality of joint layers corresponding to the first UE capability is a default value.

* * * * *